United States Patent [19]
Ostby

[11] Patent Number: 5,940,180
[45] Date of Patent: Aug. 17, 1999

[54] LASER INTERFEROMETER MEASUREMENT SYSTEM FOR USE WITH MACHINE TOOLS

[75] Inventor: Lyle D. Ostby, Sussex, Wis.

[73] Assignee: Giddings & Lewis, Fond du Lac, Wis.

[21] Appl. No.: 08/430,390

[22] Filed: Apr. 28, 1995

Related U.S. Application Data

[63] Continuation-in-part of application No. 08/320,337, Oct. 11, 1994, Pat. No. 5,489,168.

[51] Int. Cl.⁶ .................................................... G01B 9/02
[52] U.S. Cl. .......................................... 356/358; 356/345
[58] Field of Search .................................... 356/345, 358, 356/361, 363, 349

[56] References Cited

U.S. PATENT DOCUMENTS

| Re. 27,051 | 2/1971 | Chappel . |
| 2,823,591 | 2/1958 | Craddock et al. . |
| 3,035,482 | 5/1962 | Kinder .................................... 356/361 |
| 3,037,286 | 6/1962 | Bower . |
| 3,569,153 | 3/1971 | Brainard et al. . |
| 3,577,659 | 5/1971 | Kail . |
| 3,661,463 | 5/1972 | Brainard et al. ........................ 356/363 |

(List continued on next page.)

FOREIGN PATENT DOCUMENTS

| 0053199A1 | 6/1982 | European Pat. Off. . |
| 109201 | 5/1984 | European Pat. Off. . |
| 202206 | 11/1986 | European Pat. Off. . |
| 69.35394 | 7/1971 | France . |
| 2540984 | 3/1977 | Germany . |
| 221008A1 | 4/1985 | Germany . |
| 8301746 | 12/1987 | Germany . |
| 63-83608 | 6/1988 | Japan . |
| 63-233305 | 9/1988 | Japan . |
| 5-256611 | 10/1993 | Japan . |
| 558788 | 5/1977 | U.S.S.R. . |
| 1049244 | 10/1983 | U.S.S.R. . |
| 1194672 | 11/1985 | U.S.S.R. . |
| 1222538 | 4/1986 | U.S.S.R. . |
| 1224137 | 4/1986 | U.S.S.R. . |
| 1296401 | 3/1987 | U.S.S.R. . |
| 1343636 | 1/1974 | United Kingdom . |
| 2060931 | 5/1981 | United Kingdom . |
| 2083795 | 3/1982 | United Kingdom . |
| 2173472 | 10/1986 | United Kingdom . |
| 2179605 | 3/1987 | United Kingdom . |
| WO9103145 | 3/1991 | WIPO . |

OTHER PUBLICATIONS

"Milling With Universal Spindles", F. Mason, American Machinist, Jun. 1989, pp. 53–59.
"A Platform With Six Degrees of Freedom", D. Stewart, The Institute of Mechanical Engineers, Proceedings 1965–66, pp. 371–394.
"Universal Tyre Test Machine", V.E. Gough & S.G. Whiteall Proceedings, Ninth International Technical Congress F.I.S.I.T.A., May 1962, pp. 117–137.

*Primary Examiner*—Robert Kim
*Assistant Examiner*—Amanda Merlino
*Attorney, Agent, or Firm*—Foley & Lardner

[57] ABSTRACT

A measurement system for precisely measuring the distance between two points is disclosed. The measurement system includes a laser interferometer assembly having a beam splitter and a first reflector disposed to reflect a laser beam along a linear path. The laser interferometer assembly cooperates with a deadpath elimination cell having a sealed hollow interior region. The hollow interior region is sealed by at least one window disposed at the end of the hollow interior region proximate the first reflector. A second reflector is disposed on the opposite side of the hollow interior region and is oriented to reflect the laser beam back along the linear path. Thus, the volume and quantity of gas within the hollow interior remains constant to increase the accuracy in measuring the distance between the first and second reflectors.

18 Claims, 15 Drawing Sheets

U.S. PATENT DOCUMENTS

| | | |
|---|---|---|
| 3,683,747 | 8/1972 | Pettit . |
| 4,280,285 | 7/1981 | Haas . |
| 4,343,610 | 8/1982 | Chou . |
| 4,360,182 | 11/1982 | Titus . |
| 4,364,540 | 12/1982 | Montabet . |
| 4,377,036 | 3/1983 | Dangschat ............................... 356/358 |
| 4,407,625 | 10/1983 | Shum . |
| 4,512,695 | 4/1985 | Brun et al. . |
| 4,536,690 | 8/1985 | Belsterling et al. . |
| 4,556,957 | 12/1985 | Ichikawa . |
| 4,569,627 | 2/1986 | Simunovic . |
| 4,576,577 | 3/1986 | Lam et al. . |
| 4,578,763 | 3/1986 | Jones et al. . |
| 4,621,926 | 11/1986 | Merry et al. ............................. 356/363 |
| 4,643,577 | 2/1987 | Röth et al. . |
| 4,645,084 | 2/1987 | Deike . |
| 4,651,589 | 3/1987 | Lambert . |
| 4,723,460 | 2/1988 | Rosheim . |
| 4,753,596 | 6/1988 | Hart et al. . |
| 4,776,749 | 10/1988 | Wazenbergt et al. . |
| 4,806,068 | 2/1989 | Kohli et al. . |
| 4,813,783 | 3/1989 | Torge . |
| 4,819,469 | 4/1989 | Shelef . |
| 4,988,244 | 1/1991 | Sheldon et al. . |
| 5,028,180 | 7/1991 | Sheldon et al. . |
| 5,146,284 | 9/1992 | Tabarelli et al. . |

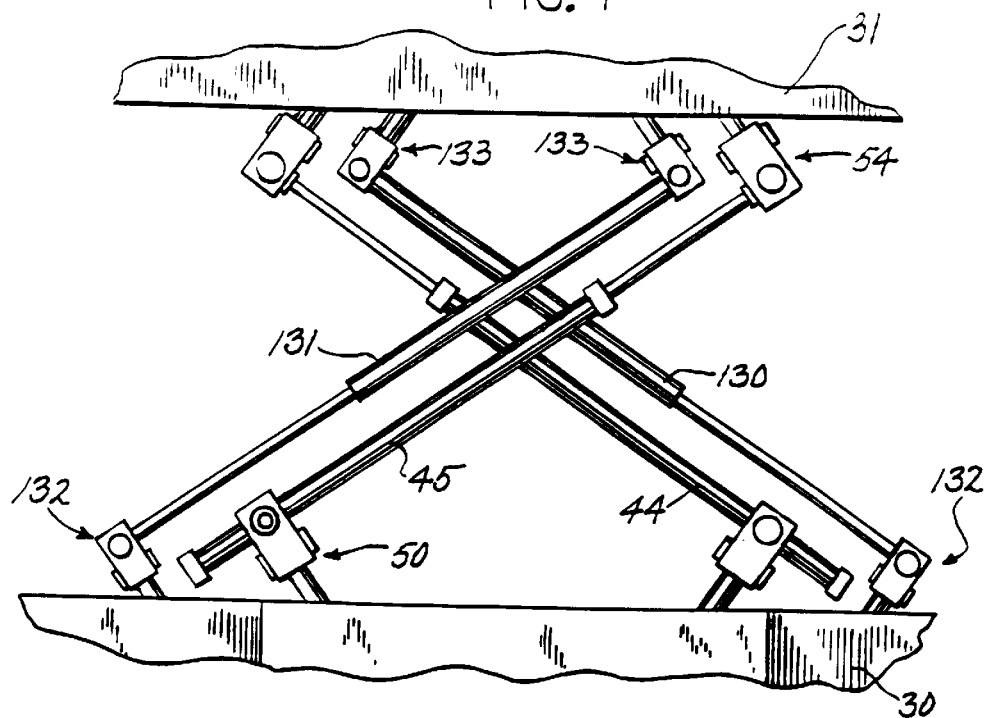
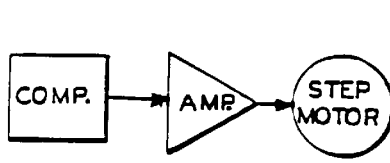
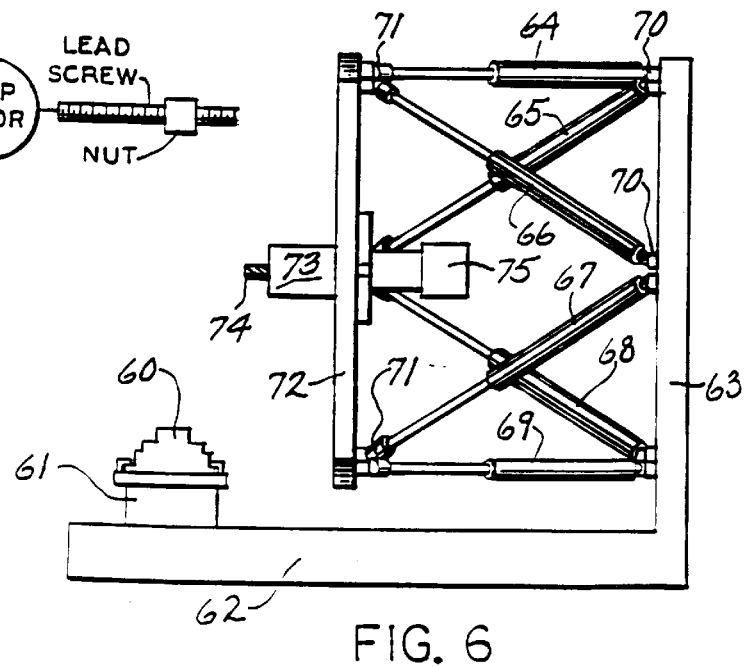

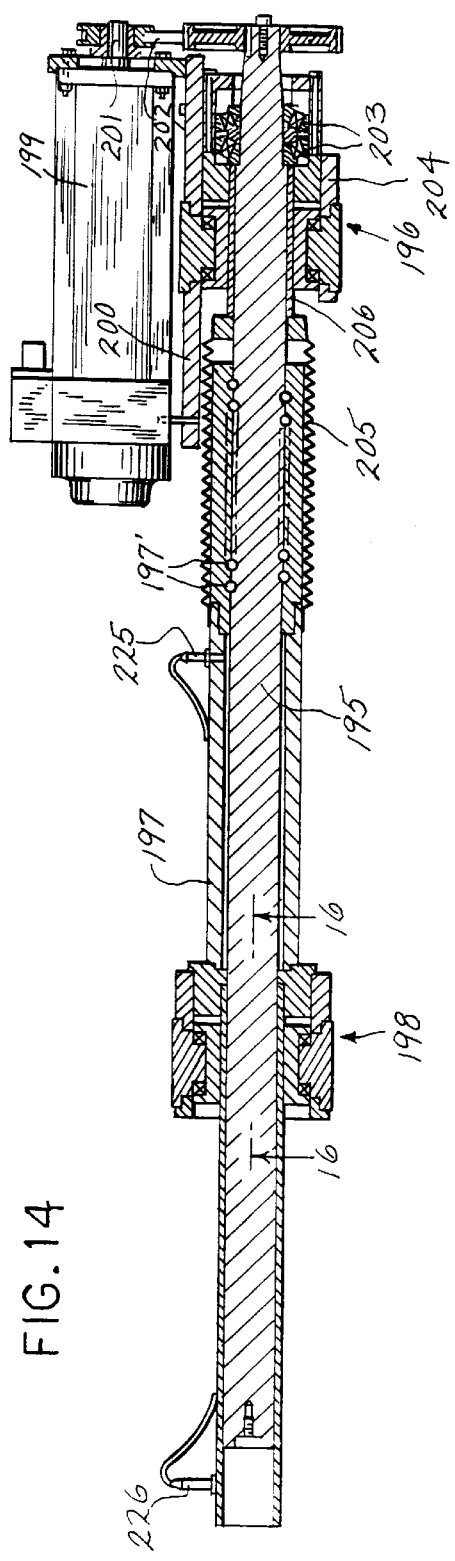
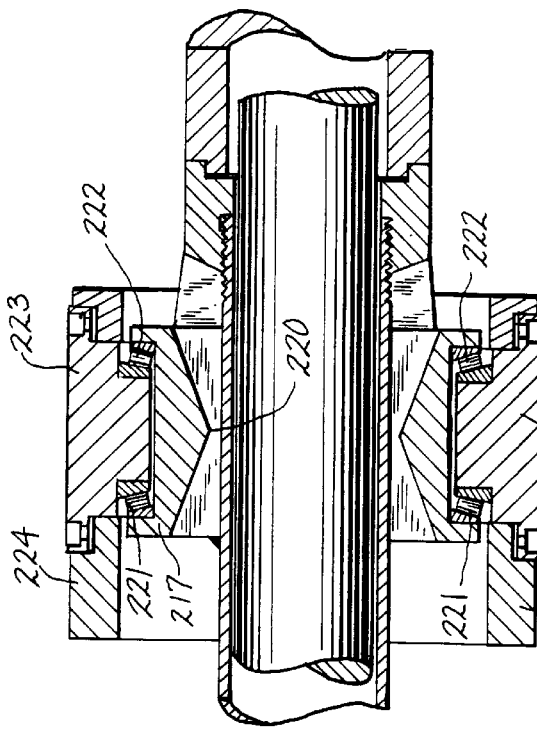
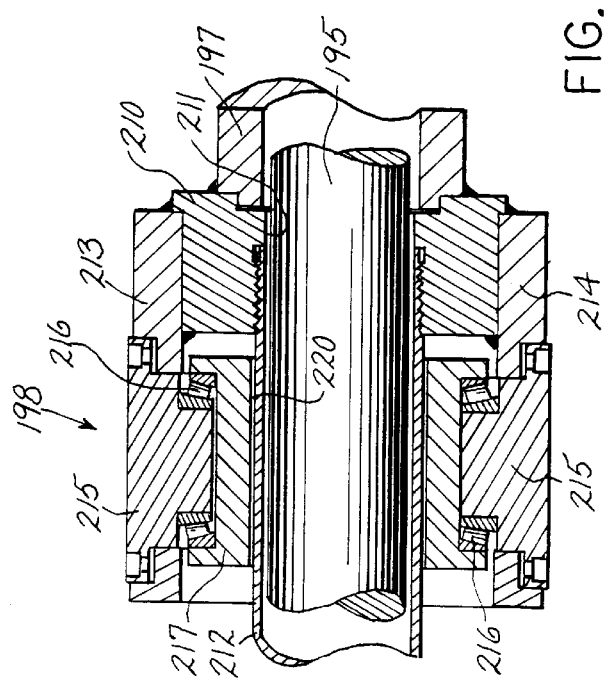
FIG. 14
FIG. 16
FIG. 15

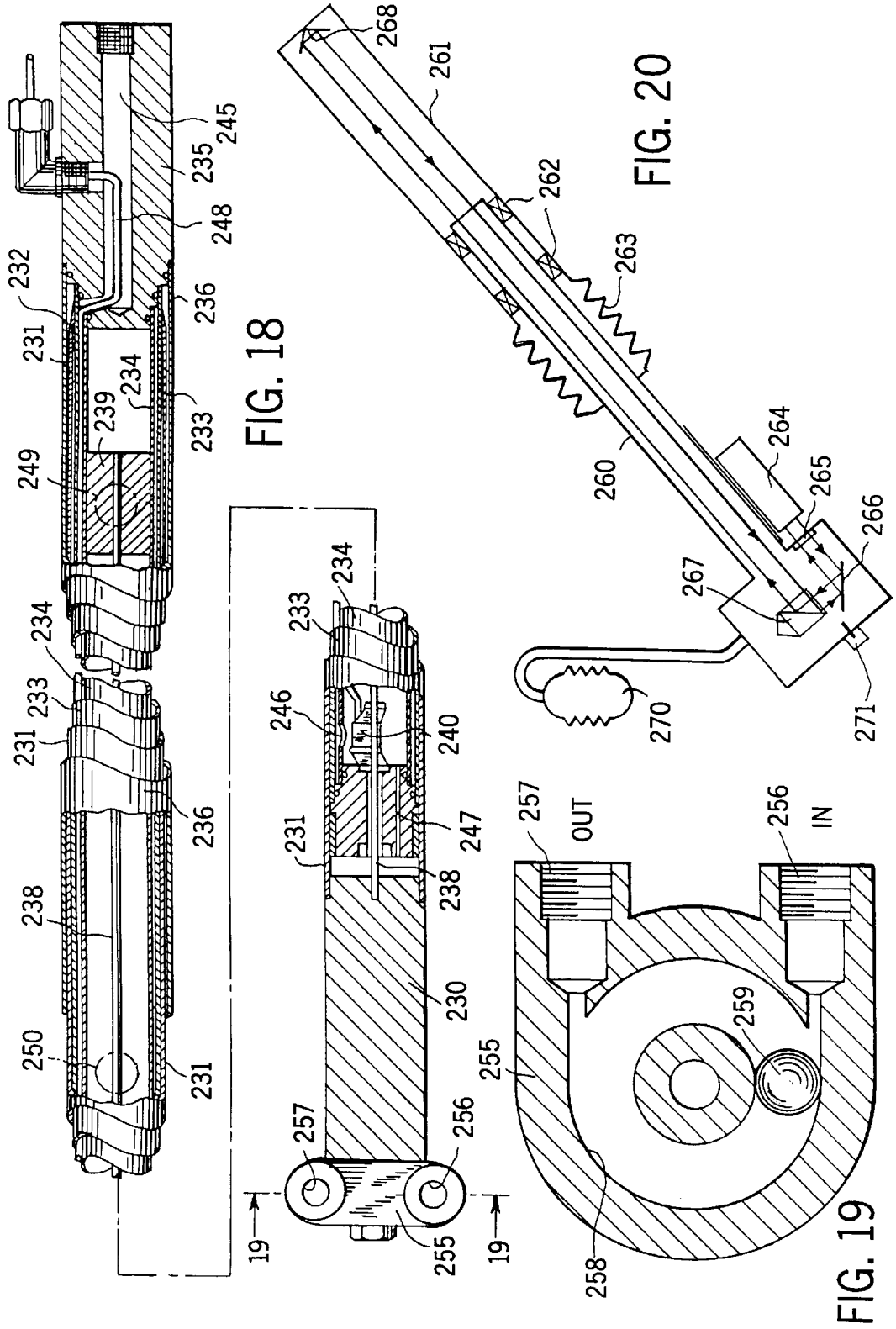

LASER INTERFEROMETER MEASUREMENT SYSTEM FOR USE WITH MACHINE TOOLS

CROSS-REFERENCE TO RELATED APPLICATIONS

This application is a continuation-in-part of U.S. patent application Ser. No. 08/320,337 (now U.S. Pat. No. 5,489,168), entitled METROLOGY INSTRUMENT ARM SYSTEM, filed on Oct. 11, 1994.

FIELD OF THE INVENTION

This invention relates generally to a measurement device for use with machines, such as machine tools, and particularly to a measurement device that incorporates a laser interferometer and a sealed cell to reduce deadpath error.

BACKGROUND OF THE INVENTION

In many machines, such as machine tools, it is important to precisely measure the distance travelled by one component relative to another. For example, in a machine tool, it is often important to precisely measure the distance travelled by the spindle relative to the base on which the workpiece is mounted to permit machining of the workpiece within predetermined tolerance limits. Other machine tools use a plurality of extensible legs to move the cutting tool and workpiece relative to one another. This type of machine requires that the amount of extension or contraction of each leg be precisely monitored to accurately cut the workpiece.

A variety of measurement devices have been incorporated into various machines to monitor the distances traveled and to provide an output signal to a controller which, in turn, precisely controls the relative distances moved between the cutting tool and the workpiece.

One type of measurement device uses a stationary grid having a pattern of equally spaced marks along the grid. A sensing head is mounted to a moveable component of the machine and moves along the grid sensing the indicator marks to provide a signal indicative of the moving component's position relative to the stationary grid.

More precise measurement may be obtained by using a laser interferometer. The movement of one component relative to another component is measured by mounting a mirror on each component. A laser light source then generates a laser beam that is split into two components by the first mirror. One component is immediately reflected back towards a photo detector while the other component is reflected to the second mirror disposed on the other moveable component. This second mirror reflects the light back to the first mirror where the two laser beam components are recombined and reflected to the photo detector. The photo detector reads the fringes resulting from interference between the two components of the laser beam as the second mirror is moved relative to the first mirror and the two laser beam components move in and out of phase. The fringes are indicative of changes in the distance between the two mirrors, and by counting the fringes, the relative movement between the components can be determined.

In other words, the laser interferometer measures relative displacement by causing two beams of light to interfere. The light beams are created when a single monochromatic beam is split into two separate light beams. Those beams are caused to follow different paths to separate mirrors where they are reflected back towards a photo detector and recombined.

The intensity of the combined beams depends on the phase difference between those beams. When they are in phase, their intensities add, but when they are 180° out of phase they subtract. Thus, if one of the mirrors moves by an amount equal to one quarter wavelength or 90°, the roundtrip difference is 180°. Therefore, the recombined beam will undergo a complete phase change as one of the mirrors moves a distance of one half wavelength with respect to the other mirror. In the typical machine application, one mirror remains stationary with respect to the beam splitter and provides a reference path. Accordingly, all apparent interference (fringes) can be assumed as caused by displacement of the other mirror.

One problem that arises with the use of laser interferometers to measure relative distances is that the wavelength of light is affected by changes in air temperature, pressure, and humidity. The laser interferometer may therefore indicate relative movement when no movement has occurred. This complication is compounded by the fact that, in many machine applications, the minimum measurement path length can be fairly large. In other words, the configuration of the machine makes it impossible to move both mirrors into proximity with the beam splitter to effectively calibrate the interferometer at the same beginning reference point prior to each use of the machine. If this were possible, then automatic compensators could be used to approximate the differences in wavelength as a function of the changing variables, such as temperature, pressure, and humidity. Also, if the minimum distance between the moving mirror and the beam splitter, commonly called the deadpath distance, were precisely known, automatic compensators could also be used to estimate the changes in wavelength. However, for many applications, automatic compensators do not provide adequate accuracy in measurement to the extent achievable by controlling the variables that effect the wavelength of light.

Thus, it would be advantageous to provide an economical way to control the variables that affect the light wavelength to permit accurate measurement of distances between components that move relative to one another.

SUMMARY OF THE INVENTION

The present invention features an apparatus and a method for measuring the distance between two points defining a linear path therebetween. The apparatus includes a deadpath elimination cell having a sealed hollow interior region disposed along the linear path. The hollow interior region is sealed by at least one window disposed at an end thereof.

A laser interferometer system cooperates with the deadpath elimination cell and includes a beam splitter and a first and a second reflector. The first reflector is disposed to reflect a laser beam along the linear path and through the sealed hollow interior. The second reflector is disposed on the opposite side of the sealed hollow interior to reflect the laser beam back along the linear path. As the distance between the first reflector and the second reflector is changed, the deadpath elimination cell and the laser interferometer system cooperate to provide an accurate measurement of the distance between those points.

In a specific adaptation of the measurement apparatus, the deadpath elimination cell and laser interferometer system are incorporated into a machine, such as a machine tool. In this environment, the measurement apparatus may comprise a first member to which the first reflector is attached and a second member to which the second reflector is attached, wherein the first and second members reciprocate with respect to one another along the linear path. In one embodiment, the moveable members are telescopic and the first moveable member includes the deadpath elimination cell. The telescopic members may be used as a leg in a multilegged machine tool and extended via a ball screw.

According to another aspect of the invention, the first member includes the sealed deadpath elimination cell while the second telescopic member is sealed in communication with an expandable bladder for containing a gas. Thus, as the first and second leg members reciprocate with respect to one another, the same gas supply is maintained and permitted to freely move between the bladder and the interior of the second leg member to prevent contamination.

BRIEF DESCRIPTION OF THE DRAWINGS

FIG. 6 is a view in elevation of a third embodiment of a machine tool in accordance with the invention;

FIG. 7 is a partial view in elevation of a leg and instrument arm arrangement usable with any of the embodiments of the invention;

FIG. 10 is a schematic diagram of a third embodiment of a control system;

FIG. 14 is a view in longitudinal section of a powered extensible leg usable with the above embodiments of machine tools;

FIG. 15 is a partial view in longitudinal cross section, to an enlarged scale, of one of the yoke assemblies for connecting the powered leg to a platform or support;

FIG. 16 is a view in longitudinal cross section through the yoke assembly of FIG. 15 and taken in the plane of the line 16—16 in FIG. 14;

FIG. 18 is a foreshortened view in longitudinal cross-section of an instrument arm usable with the above embodiments of machine tools;

FIG. 19 is a view in cross section of one end of the instrument arm of FIG. 18 and taken in the plane 19—19 in FIG. 18;

FIG. 20 is a schematic view of an instrument arm using a laser interferometer for measuring distances in accordance with the present invention;

DETAILED DESCRIPTION OF THE PREFERRED EMBODIMENT

Figure 2:
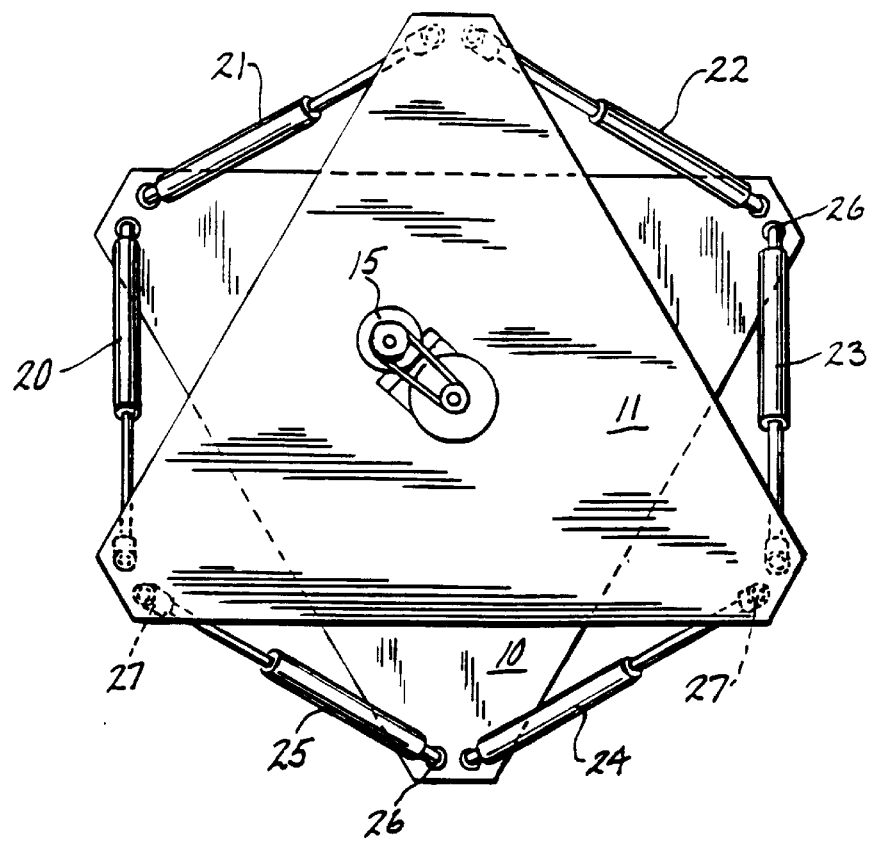
FIG. 2 is a top plan view of the machine tool of FIG. 1.
Figure 1:
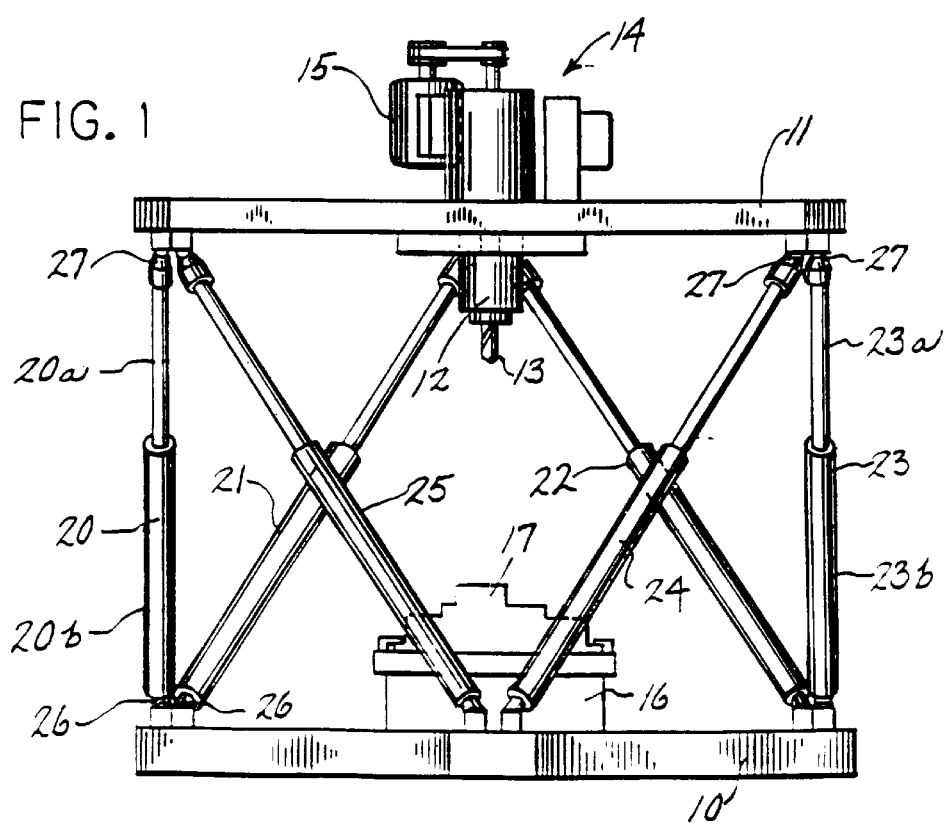
FIG. 1 is a view in elevation of a machine tool in accordance with the present invention.

Referring to FIGS. 1 and 2, the machine tool of the first embodiment has a base 10 in the nature of a support or platform and a spindle support or platform 11 spaced from the base 10. A spindle head 12 is mounted on the spindle platform 11 and is adapted to receive a rotating cutting tool 13. A spindle drive assembly indicated generally by the numeral 14 is mounted on the spindle platform 11 and the drive includes a motor 15 connected by a power train to the spindle head 12 in a usual manner. The base platform 10 carries a workpiece support 16 which in turn receives a workpiece represented by the part 17.

The spaced platforms 10 and 11 are joined together by six powered and extensible legs 20–25. Each of the legs is pivotally mounted at its lower extremity to the base platform 10 by a ball and socket joint 26. Similarly, each of the upper ends of the legs 20–25 is pivotally attached to the spindle platform 11 by a second ball and socket joint 27.

The legs 20–25 may be formed of telescoping upper and lower parts 20a and 20b, for example. The telescoping parts may be the piston rod 20a and cylinder 20b of a hydraulic cylinder. The length of such legs can be adjusted by controlling the volume of hydraulic fluid in each end of each cylinder.

The position of the spindle support 11 relative to the base support 10 and therefore the position of the cutting tool 13 relative to the workpiece 17 can be adjusted by simultaneously manipulating the length of each of the six legs 20–25. Within an envelope of motion the cutting tool 13 can be applied against all five exposed surfaces of a cubic type workpiece. The only constraints to the envelope of motion relative to the five exposed surfaces are the spread of the joints 26 on the base support 10 and the spread of the second joints 27 on the spindle support 11, the minimum and maximum length of the legs 20–25, the total range of linear motion of each of the legs, and the need to avoid placing certain legs in a common plane for purposes of stability. Within the envelope of motion, this construction allows the machining of contours in three dimensions as well as straight line point-to-point machining.

The simultaneous manipulation of the length of each of the legs 20–25 can achieve motion in all six axes. That is, motion in a linear direction along each of the three orthogonal axes and rotary motion about each of those three axes.

In the embodiment of FIGS. 1 and 2, the six legs may be considered to be arranged in three pairs. That is, the legs 20 and 21 constitute a pair, the legs 22 and 23 constitute a second pair, and the legs 24 and 25 constitute a third pair. It should be noted that the legs of each pair are arranged so that they are at an angle with respect to each other. The joints 26 of the pair of legs 20 and 21 are close to each other. The joints 27 of adjacent legs 20 and 25, for example, are also close to each other. The effect is that the lower joints 26 generally define a triangle and the upper joints 27 also generally define a triangle. These two triangles and the six legs generally define edges of an octahedron. As shown in FIGS. 1 and 2, the area of the base platform 10 circumscribed by the lower ball joints 26 and the area of the spindle support 11 circumscribed by the upper ball joints 27 are substantially the same. This is advantageous for several reasons. First, such an arrangement maximizes the structural stiffness of the machine. Secondly, the footprint of the machine is minimized for a particular cubic size of workpiece to be handled. Also, a greater envelope of surface area for the workpiece can be accommodated before certain legs and supports are positioned in a common plane thereby creating a potentially ambiguous position.

Figure 3:
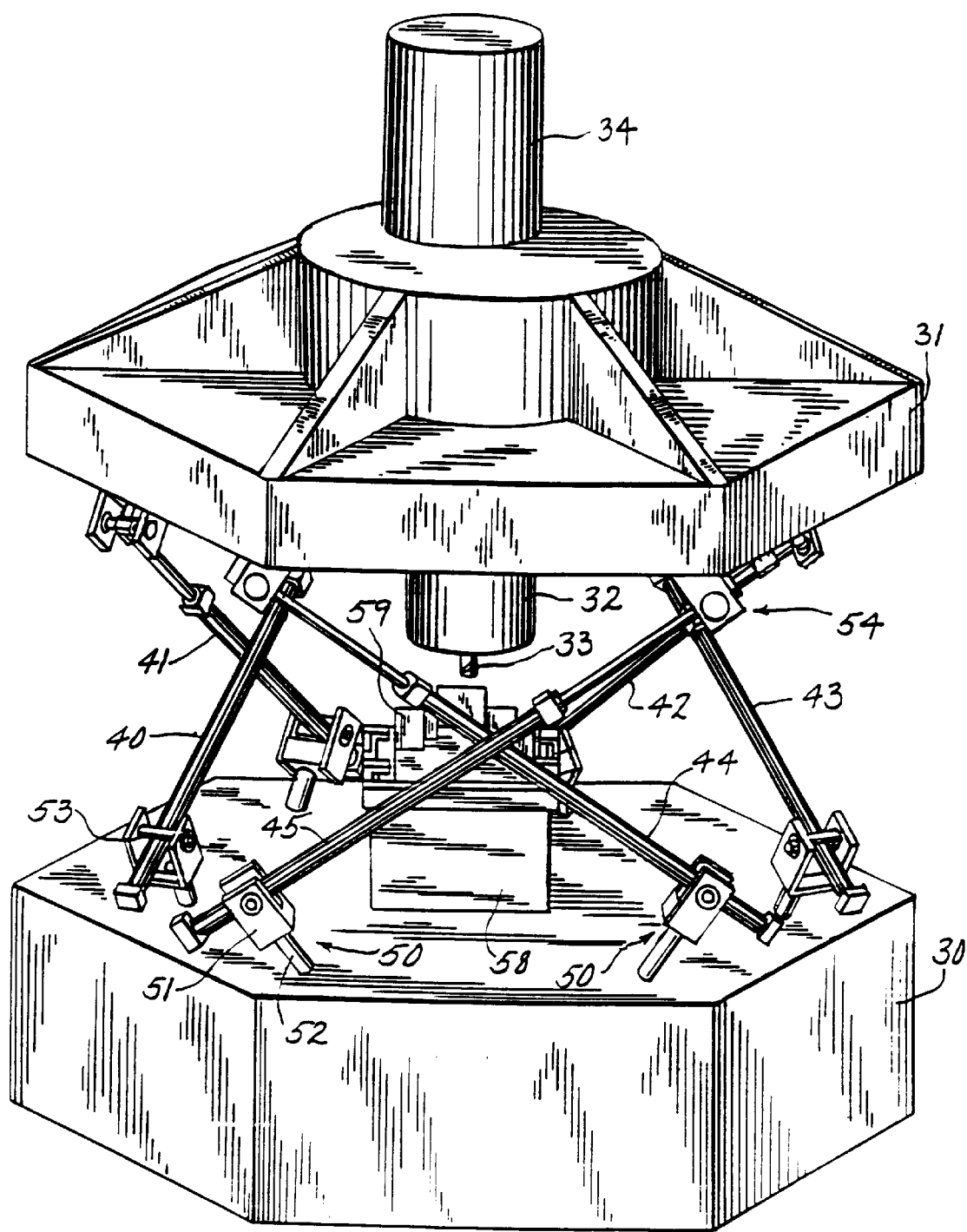
FIG. 3 is a view in perspective of a second embodiment of a machine tool in accordance with the present invention.
Figure 4:
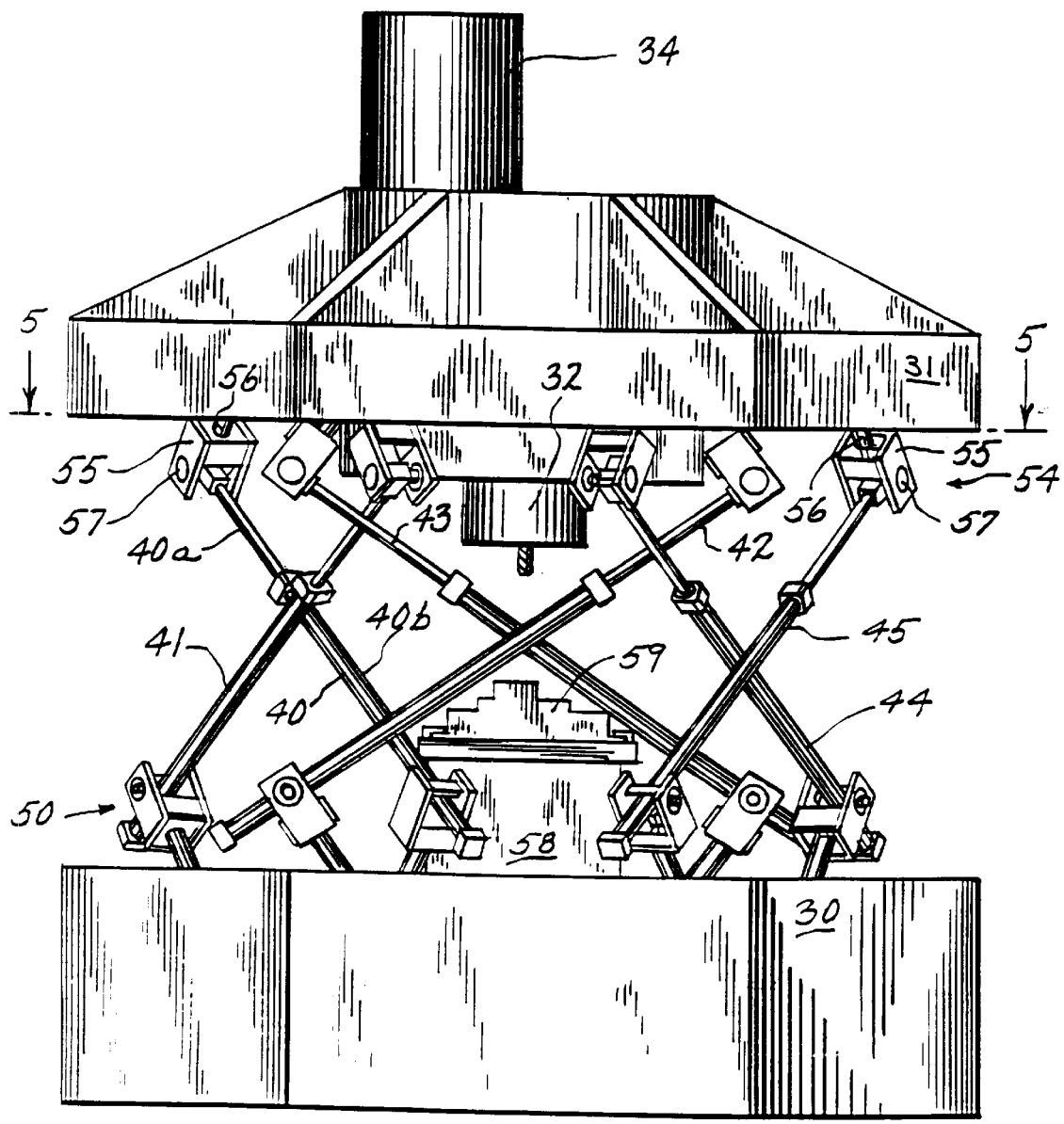
FIG. 4 is a view in elevation of the machine tool of FIG. 3.
Figure 5:
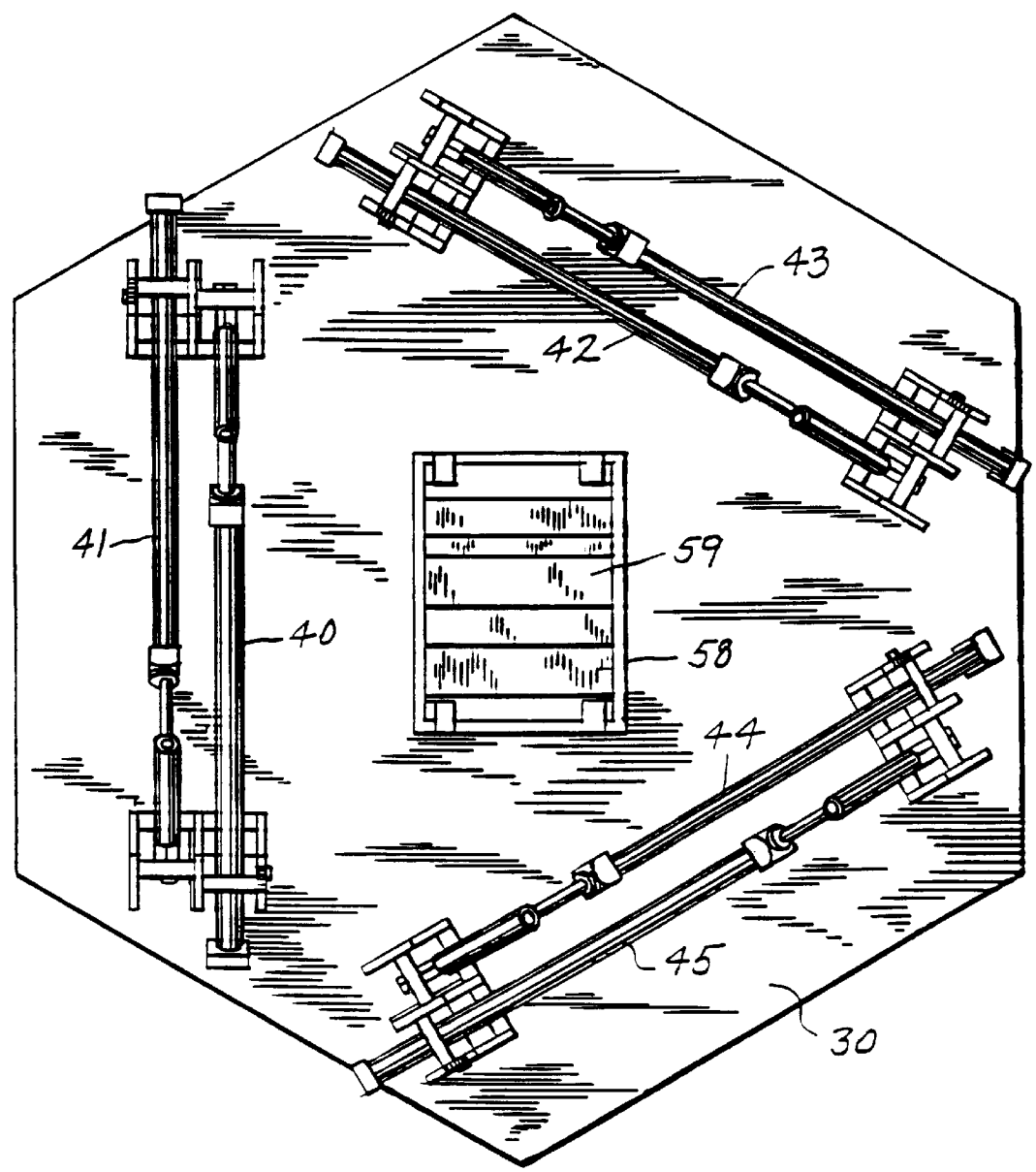
FIG. 5 is a top view of the machine tool of FIGS. 3 and 4 as viewed through the section of the plane 5—5 of FIG. 4.

Referring to FIGS. 3–5, the second embodiment includes a base support or platform 30, a spindle support 31 which mounts a spindle head 32 adapted to receive a cutting tool 33. The spindle head is rotated by a spindle drive 34. The base support 30 and spindle support 31 are connected by six extensible legs 40–45. The legs are arranged in three pairs such as the pair 40 and 41 and legs of each pair cross each other so that they are again mounted at an angle with respect to each other. The legs 40–45 are also formed of telescoping upper and lower elements 40a and 40b, for example.

The legs 40–45 are joined to the base support 30 at a first point near their lower end by a joint indicated generally by the numeral 50. The joint 50 includes a clevis 51 mounted for rotation about the axis of a shaft 52 that projects from the base support 30. A typical trunnion 53 engages the lower element 40b–45b of each leg and is rotatably mounted in a clevis 51. It will thus be seen that a joint 50 provides two degrees of freedom of movement.

The upper telescoping portions 40a–45a of the legs are similarly joined to the spindle support 31 at second points along the length of the legs by joints 54. The joints 54 likewise consist of a clevis 55 rotatably mounted on a shaft 56 extending downwardly from the underside of the spindle support 31 and a trunnion 57 which supports the upper leg portions 40a et seq. in the clevis 55. As can be seen in FIG. 5 in particular, the joints 50 and 54 and their attachments to the supports 30 and 31 define the corners of a six-sided polygon in each of the two supports. As is apparent from FIGS. 3–5, the area of the base support 30 that is circumscribed by the connections of six lower joints 50 with the base support 30 is substantially the same as the area of the spindle support 31 that is circumscribed by the connections of the six upper joints 54 with the spindle support 31.

The shafts 52 and 56 of the joints 50 and 54 can be mounted in their respective supports to project in any direction. The ball joints of the first embodiment could also be used in this second embodiment, and the trunnion joints of this second embodiment could be used in the first.

The base support 30 mounts a workpiece support 58 which holds a workpiece exemplified by the part 59.

The legs 40–45 may also be formed as hydraulic cylinders with the piston rod defining the upper end 40a et seq. and the cylinder portion forming the lower ends 40b et seq. Because the piston rod can rotate within the cylinder, the two degrees of motion afforded at each of the joints 50 and 54 are sufficient. If the upper and lower portions of the actuators forming the legs cannot be allowed to twist, an actuator other than a hydraulic cylinder is used to accomplish the extension, and a third degree of rotational motion will be required in one or the other of the upper and lower joints 50 and 54. In the leg of FIGS. 14–17, an additional degree of motion is required in the joints or compensation must be provided for the linear inaccuracy resulting from relative rotation of the telescoping parts introduced by slight angular displacement of the yoke assemblies relative to each other.

Instead of using hydraulic cylinders as the actuators for the legs, any means for achieving linear motion can be used such as forming the upper portion of each leg as a lead screw and mounting a rotating nut in the lower portion of the leg or vice versa. Alternatives are linear motors, recirculating ball screw drives, chair drives, and so forth.

In the third embodiment of FIG. 6, neither the tool nor the workpiece is located within the envelope defined by the leg structure. The workpiece 60 is mounted on a workpiece support 61 which in turn is mounted on a base 62 that is attached to an upright 63. The six legs 64–69 are connected at one end to the upright 63 by trunnion joints 70 in a manner similar to that of the second embodiment. The opposite ends of the legs 64–69 are connected by trunnion joints 71 to the spindle support 72. The spindle support carries a spindle 73 adapted to mount a tool 74 and the spindle 73 is driven by a spindle drive 75. The tool 74 projects away from the envelope defined by the legs 64–69. The third embodiment is otherwise the same as the first embodiment.

In the third embodiment, the workpiece support 61 may be mounted on ways supported by the base 62 so that the workpiece support 61 with the workpiece 60 may move relative to the tool 74. Even though the workpiece 60 is not mounted on the upright 63, the workpiece location relative to the upright support 63 can be fixed, or at least known, at any instant in time.

Other arrangements of the spindle and workpiece can also be employed, such as mounting the workpiece above the spindle or mounting an upright 63 as in the third embodiment of FIG. 6 on ways so that it can travel along the length of a workpiece.

Figure 8:
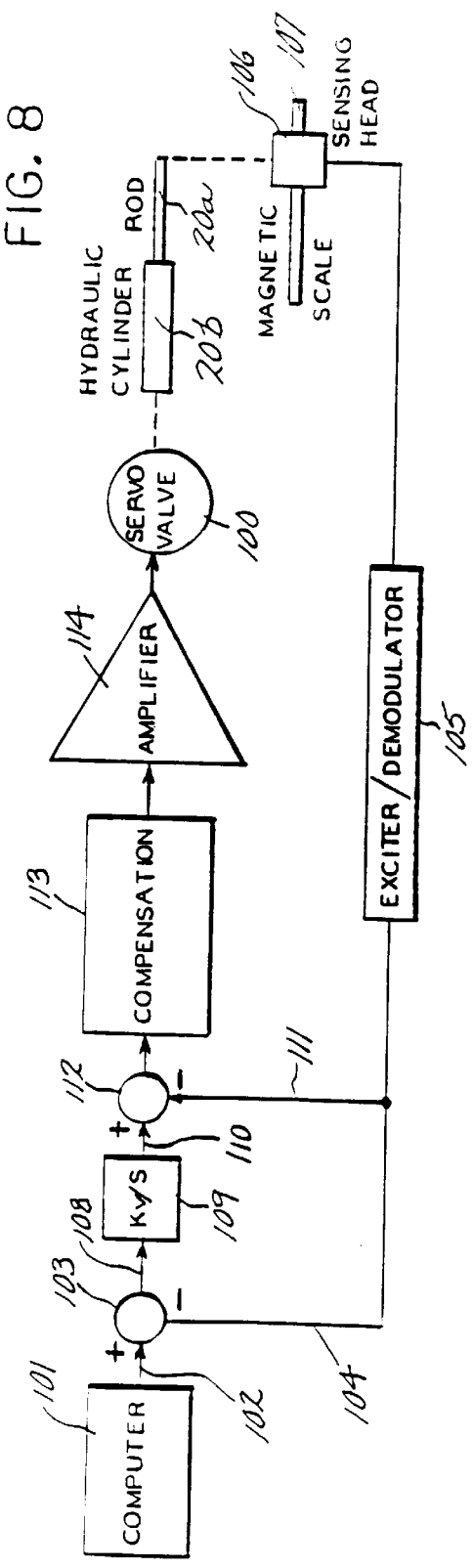
FIG. 8 is a schematic view of a control system for a machine tool in accordance with the invention.
Figure 9:
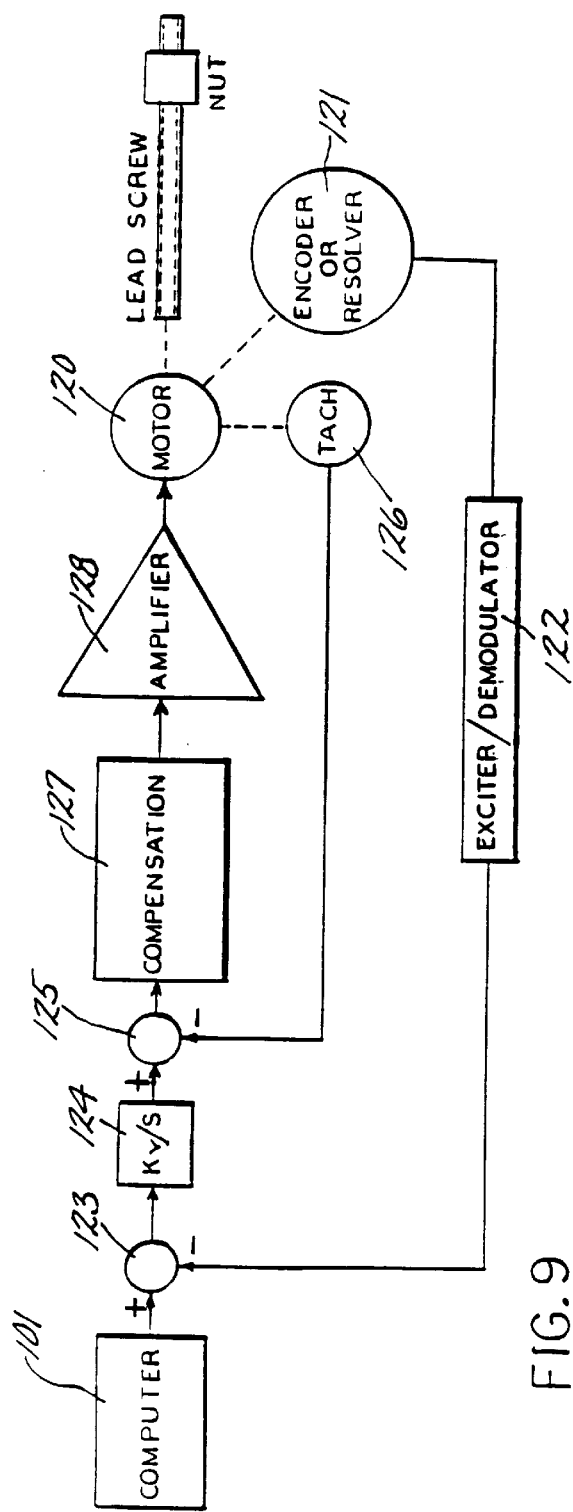
FIG. 9 is a schematic diagram of a second embodiment of a control system.

The legs must be moved in a coordinated manner in order to position the supports or platforms relative to each other. The coordinated movement is preferably accomplished by a computer control which provides a position signal for each leg to achieve a desired position for the spindle platform relative to the base platform and therefore for the cutting tool relative to the workpiece. Suitable control schemes are illustrated in FIGS. 8 and 9. In FIG. 8, the leg in the form of a hydraulic cylinder such as the legs 20–25 are controlled by a servo valve 100 which controls the volume of hydraulic fluid in the cylinder on each side of the piston and therefore the position of the piston rod within the cylinder. A computer 101 produces an output position command in the line 102. That position command is compared in a summing circuit 103 with a feedback position signal in a line 104 leading from an exciter/demodulator 105 that receives the signal from a sensing head 106 traveling along a magnetic scale 107. The sensing head 106 is coupled to the piston rod 20a et seq. so that changes in position of the piston rod will be reflected in changes in position of the sensing head 106 along the magnetic scale 107 which is at a known position, either fixed or varying, with respect to the hydraulic cylinder 20b et seq. The summing circuit 103 produces a position error signal in a line 108 which inputs to an integration network 109, the output of which is a velocity command in a line 110. The velocity command is compared with a velocity feedback signal in a line 111 leading from the exciter/demodulator 105 and the two signals are fed to a summing circuit 112 which produces an output signal representative of a velocity error. This velocity error signal is fed to a compensation network 113 where phase shift compensation takes place, and the resulting compensated signal is fed to an amplifier 114 which in turn controls the servo valve 100.

A similar control loop leading from the computer would be provided for each of the six legs 20–25 and the computer 101 would generate an output position command for the desired position of each of the six legs to achieve a particular finite position of the cutting tool relative to the workpiece.

The control arrangement of FIG. 9 is similar to that of FIG. 8 but is shown in relation to a motor 120 rotating a lead screw and nut arrangement. An encoder or resolver 121 is connected to the motor 120 to provide a position feedback signal through the exciter/demodulator 122, and that position signal is compared at a summing junction 123 with the position command from the computer 61 to produce a position error signal fed to the integration network 124 which outputs a velocity command compared at a summing junction 125 with the velocity position signal from a tachometer 126 connected to the motor 120. A compensation network 127 functions to produce an appropriate signal to an amplifier 128 connected to the motor drive. Once again, there would be a similar loop for each of the six legs of the machine.

The control schemes of FIGS. 8 and 9 employ closed loop control. However, by using a stepping motor it is not necessary to have a closed loop control. An example of a control system using a stepping motor is shown in FIG. 10.

Position signals can be provided by sensors that are directly connected to each of the legs or to the actuators for the legs. However, a more accurate approach uses separate instrument arms. Such an arrangement is shown in FIG. 7.

In FIG. 7, a six legged machine tool of the embodiment shown in FIGS. 3–6 has separate instrument arms 130 and 131 associated with respective powered legs 44 and 45, respectively. The instrument arms 130 and 131 are each linearly extensible and are connected at their lower ends to the base platform 30 by trunnion joints 132 and at their upper ends to the spindle platform 31 by trunnion joints 133. The trunnion joints 132 and 133 are the same in structure and operation as the joints 50 and 54 used to connected power legs 44 and 45 to the platforms 30 and 31.

The instrument arms 130 and 131 are used solely for the purpose of sensing the relative positions of the platforms. The instrument arms can include a sensing head traveling along a magnetic scale to provide the desired feedback signal as to length and therefore as to position. Other forms of instrument arms can also be used. The advantage in using separate instrument arms is that the load deflections that will occur in the power legs and their joints will not be translated into errors in the position of the cutting tool. The instrument arms being smaller and lighter and carrying no weight other than their own, are not subject to the same forces and deflections to which the powered legs are subject.

Although the instrument arms 130 and 131 are shown mounted parallel with respective power legs, it is not necessary for the instrument arms to be so mounted. Instrument arms are not required to be associated with any particular power leg. It is, however, necessary, to have at least six instrument arms to provide an unambiguous set of signals for the positions of the supports or platforms relative to each other.

Figure 11:
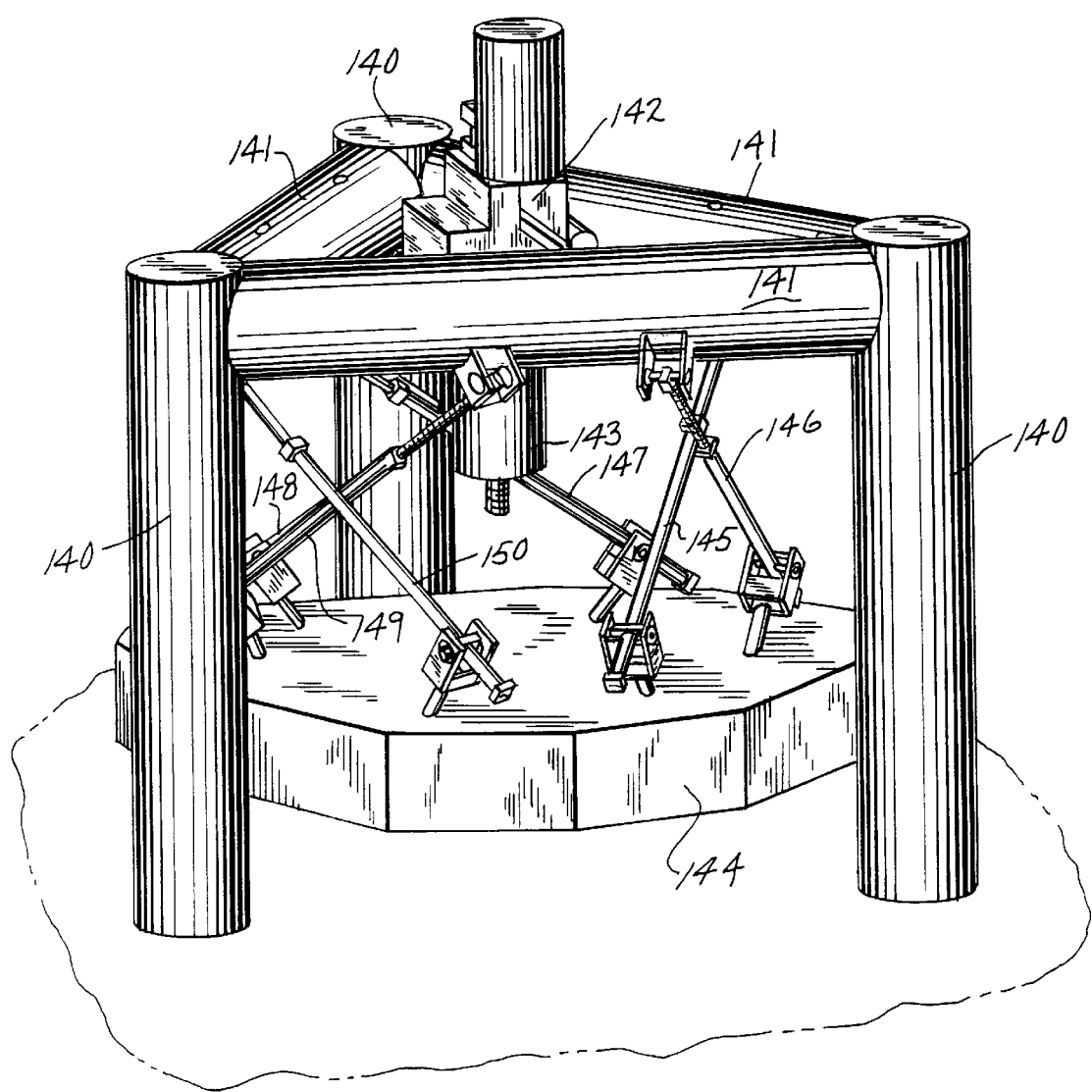
FIG. 11 is a view in perspective of a fourth embodiment of a machine tool in accordance with the invention.

In the fourth embodiment of FIG. 11, one of the platforms is elevated and the second platform is suspended from the first platform on the six legs. Specifically, a support structure is formed from three upright columns 140 jointed together by a triangular framework of members 41. A spindle housing 142 is supported on the triangular framework of members 141 with a spindle 143 pointing downwardly towards a workpiece platform 144. The workpiece platform 144 is suspended on six extensible powered legs 145–150 which are arranged in pairs of crossing legs, similar to the arrangement of the legs 40–45 in the second embodiment of FIGS. 3, 4 and 5. The workpiece platform 144 may mount a pallet with a workpiece (not shown) in the usual manner. The legs 145–150 are pivotally joined at their upper ends to the members 141 and at their lower ends to the workpiece platform 144 in a manner similar to that of the second embodiment.

One advantage of suspending a platform on the six legs is that in case of a gross power failure which could cause the power legs to lose their ability to support a platform, the work platform 144 would move away from the spindle. This would result in no damage to either the spindle, the tool, or the workpiece because there would be no collision between the parts. In contrast, in an arrangement as shown in the first and second embodiments, a gross power failure in which the power legs lose their ability to support a platform could result in the spindle crashing in to the workpiece or workpiece support.

Instead of the workpiece platform being suspended beneath the spindle platform, the workpiece platform could be above a suspended spindle platform. Then, chips would naturally fall away from the workpiece.

Figure 12:
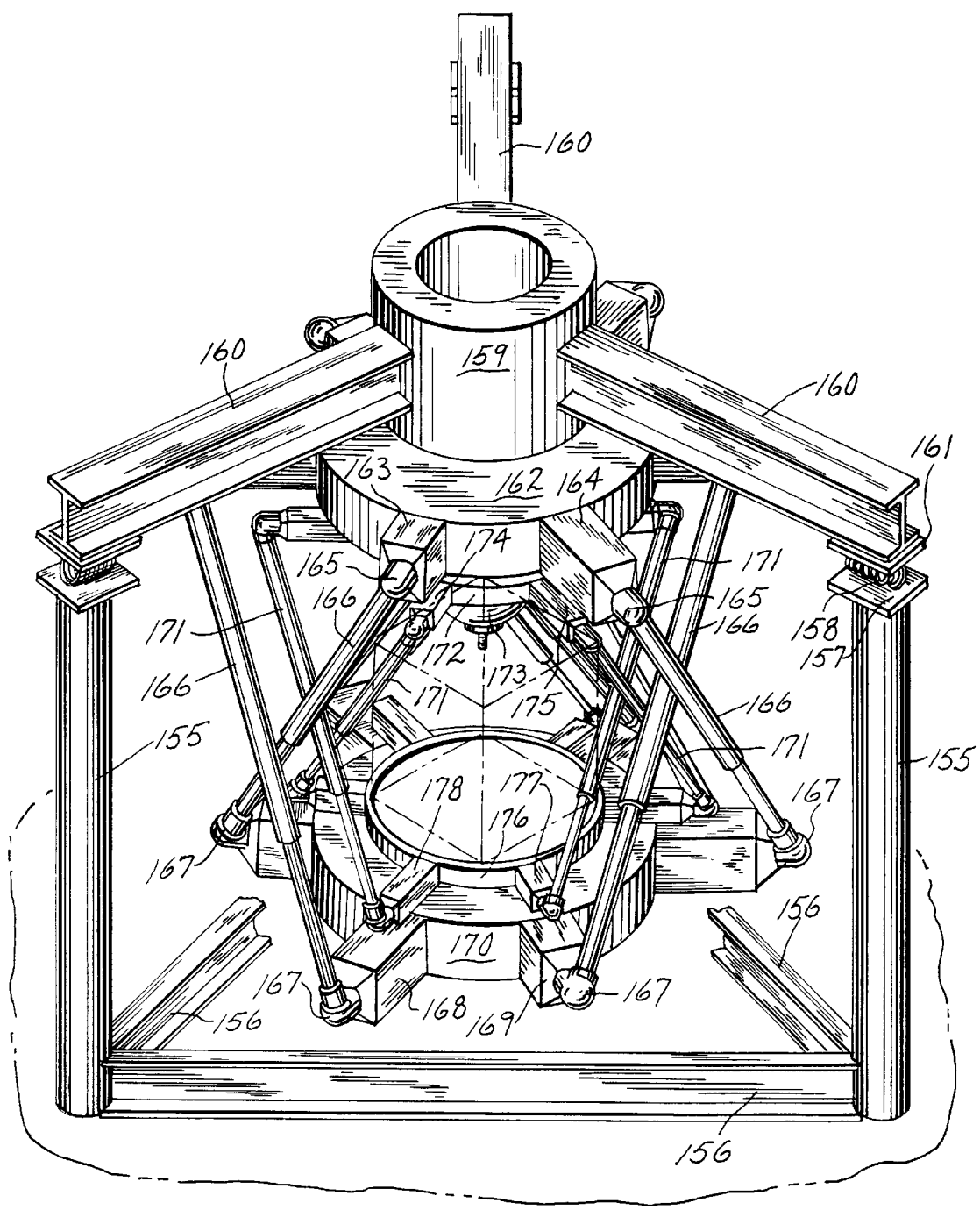
FIG. 12 is a view in perspective of a fifth embodiment of a machine tool in accordance with the invention.

The fifth embodiment of FIG. 12 also suspends a workpiece platform from a support. In addition, it provides an instrument arm associated with each of the six power legs and a spoke-like system of connects of the ends of the powered legs and instrument arms to the platform and support.

Specifically, the fifth embodiment of FIG. 12 has three upright columns 155 joined at their base by three I-beams 156 (two of the beams are shown foreshortened for clarity). The top of each column 155 carries a bearing plate 157 on which a vibration isolation member such as a coil spring 158 rests. A spindle housing 159 has three radiating support arms 160 in the form of I-beams. The outer ends of the support arms 160 each mounts a bearing plate 161 which rests upon a respective isolation member 158.

The spindle head 159 is mounted on top of a ring platform 162 from which two series of spokes 163 and 164 project. The spokes 163 and 164 are of two lengths that alternate around the ring platform 162 and the spokes mount the universal joints 165 that connect the upper ends of six powered legs 166 to the platform 162. The lower ends of the powered legs 166 are connected to universal joints 167 mounted at the ends of spokes 168 and 169 which project radially from a ring-like work platform 170. The spokes 163, 164 and 168, 169 are of different lengths to accommodate the overlapping and crossing arrangement of the powered legs 166, which is similar to that in the second and fourth embodiments.

A similar arrangement of rings and spokes is used to mount universal joints at the ends of six instrument arms 171. That is, a second ring structure 172 is disposed beneath the ring support 162 at the spindle end and about the spindle 173. A series of radially projecting spokes 174 and 175 of two different lengths project from the ring 172. The bottom workpiece platform 170 contains a second ring 176 from which two series of spokes 177 and 178 project to mount the universal joints at the bottom ends of the instrument arms 171. The instrument arms 171 are arranged in pairs of crossing arms in the same manner as the powered legs 166.

The use of spokes emanating from the platform allows the powered legs and instrument arms to be removed from close proximity to the central axis of the spindle head and workpiece support with the result that it is easier to load a workpiece onto the workpiece platform. This is illustrated in FIG. 12 in which a phantom line identifies a cubic workpiece which could be accepted by the machine tool and it may be noted that there is an opening through the powered legs 166 and instrument arms 171 to accommodate the insertion and removal of a workpiece of that size.

The ring structure 172 and the ring 176 can be structurally independent from the ring platform 162 and the work platform 170, the instrument arms 171 can be structurally isolated from the deflections of the platforms induced by the powered legs 166.

Figure 13:
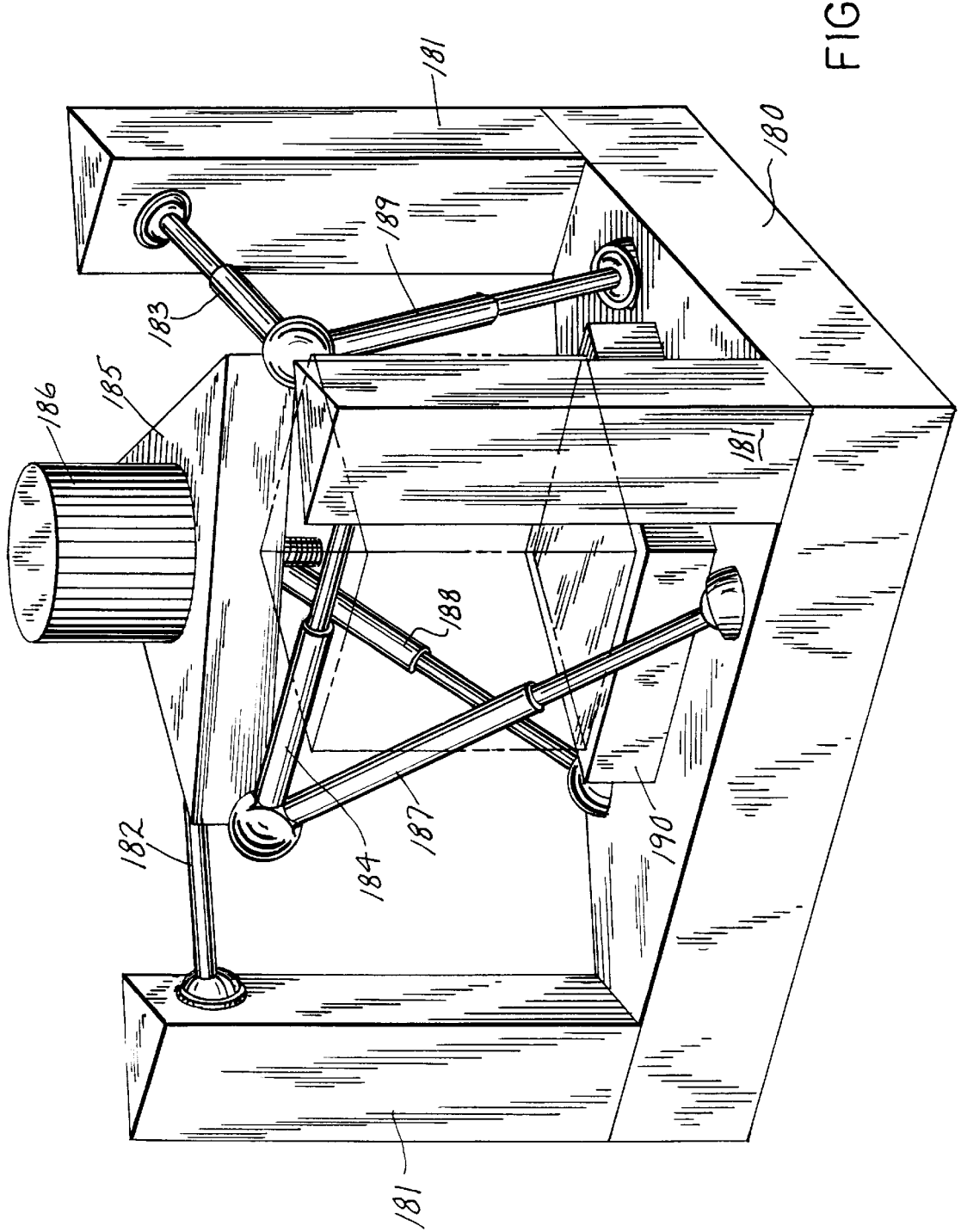
FIG. 13 is a view in perspective of a sixth embodiment of a machine tool in accordance with the invention.

The sixth embodiment of FIG. 13 arranges three of the six legs in a different attitude than that of the prior embodiments. Specifically, three of the legs are mounted in or near a common plane that includes the upper platform. As shown in FIG. 13, a base 180 of generally triangular shape mounts triangular columns 181 at each of its corners. Three powered legs 182, 183 and 184 extend from universal joints disposed near the upper end of each of the columns 181. The other ends of the three legs 182, 183 and 184 are mounted in universal joints at the corners of a triangular spindle platform 185 which mounts a spindle head 186. The remaining three powered legs 187, 188 and 189 extend from universal joints in the base 180 upward to the three corners of the triangular spindle platform 185. A workpiece platform 190 rests on the base 180 within the envelope of the three legs 187, 188, and 189.

The embodiment of FIG. 13 functions in the same manner as the other embodiments and demonstrates that it is not necessary for the legs to extend between two planes, so long as the legs extend between the two platforms. The six legs in the embodiment of FIG. 13 extend from the workpiece platform represented by the base 180 and its columns 181, and to the spindle platform 185.

FIGS. 14–17 illustrate a ball screw driven powered leg usable with the machines of the present invention. Generally, a rotatable ball screw rod 195 is mounted with a stationary platform yoke assembly indicated generally by the reference numeral 196. A nut tube 197 surrounds and is operatively connected to the ball screw rod by a plurality of recirculating balls 197'. The nut tube 197 is connected to a moveable platform yoke assembly indicated generally by the numeral 198. The yoke assemblies 196 and 198 are connected to the stationary and movable platforms of the machine tool, respectively. The ball screw rod 195 is rotated by a hydraulic or electric motor 199 mounted on a bracket 200 connected to the stationary yoke assembly 196. The motor has an output shaft 201 connected to the ball screw rod 195 by a toothed belt 202 operating between pulleys connectively to the output shaft 201 and the ball screw rod 195. The ball screw rod 195 is journaled in a pair of thrust bearings 203 mounted in a cage associated with a motor fork 204 that forms part of the stationary platform yoke assembly 196. A bellows 205 is connected at one end to the nut tube 197 and at the other end to a tube 206 which, in turn, is connected to the motor for 204.

As the ball screw rod 195 is rotated by the motor 199, the nut tube 197 will move along the length of the rod 195 in a direction dependent upon the direction of rotation of the rod 195. The effect will be to reduce or extend the distance between the yoke assemblies 196 and 198 thereby varying the effective length of the leg.

Figure 17:
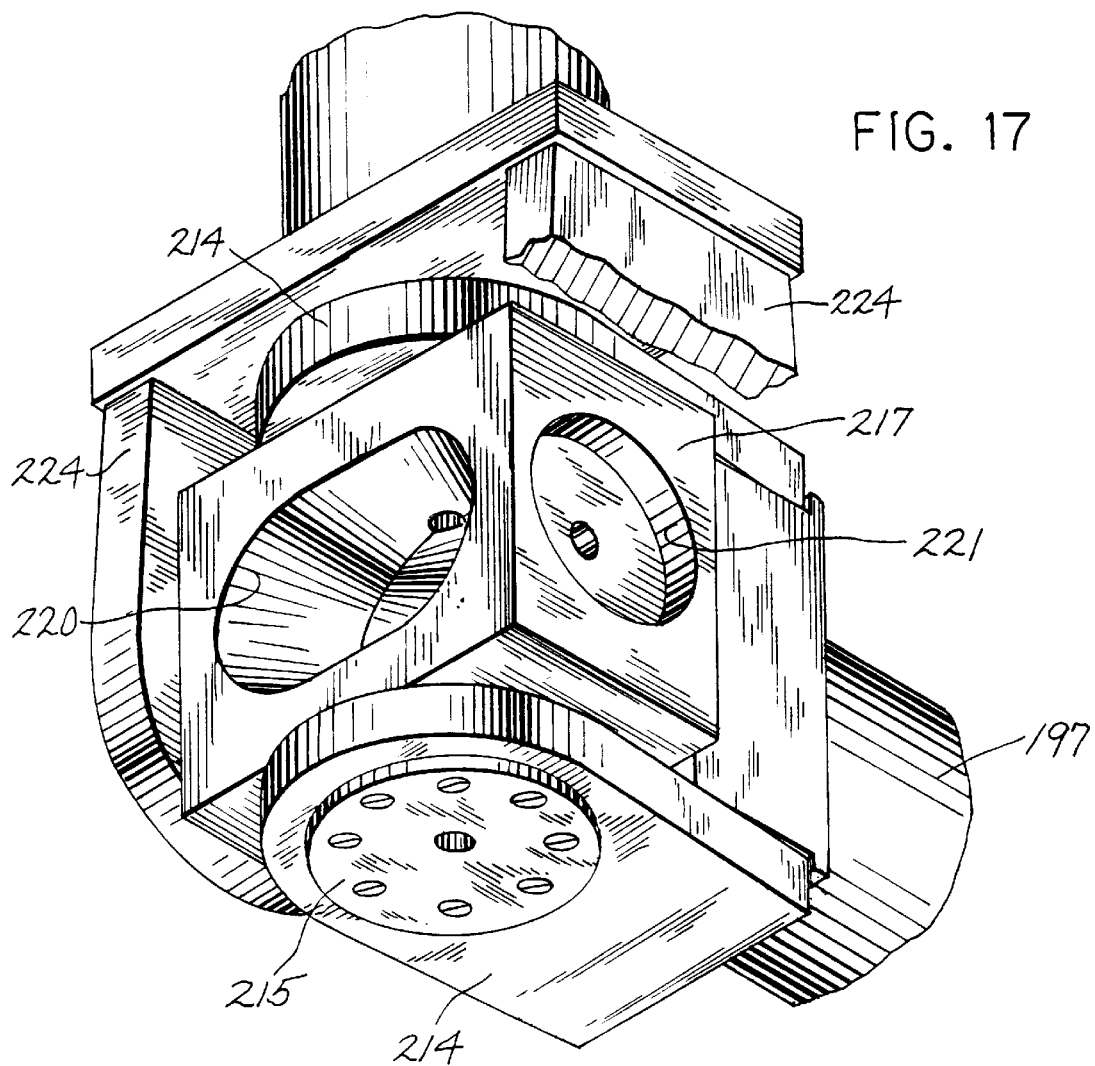
FIG. 17 is a view in perspective of the yoke assembly of FIGS. 15 and 16.

Referring specifically to FIGS. 15–17, the movable platform yoke assembly 198 includes a U-shaped fork 210 which is connected to the nut tube 197 and which has a central opening 211 through which the screw rod 195 passes. A protective tube 212 extends from the fork 210 along the outside of the screw rod 195. The side arms 213 and 214 of the fork 210 mount bearing holders 215 that hold the inner race of thrust bearings 216 which are received in recesses in opposite side faces of a block 217. The block 217 has a central opening 220 which is flared from the mid-point of the opening towards the opposite ends of the block 217, as shown in FIG. 16. The remaining two side faces of the block 217 have bearing recesses 221 which receive thrust bearings 222 held in place by a bearing retainers 223. The bearing retainers 223 are mounted in spaced arms 224 of a second fork attached to the movable platform. By reason of the construction, the two forks are disposed at 90° from each other.

As will be appreciated, the yoke assembly 198 allows rotary motion about an axis through the bearings 222 and rotary motion about an axis through the bearings 216. The flared shape of the opening 220 accommodates the latter rotary motion. The construction and operation of the fixed platform yoke assembly 196 is the same as that described for the movable platform yoke assembly 198.

Mounting the yoke assemblies at points along the length of the powered leg, rather than at the ends, results in a significant increase in the ratio of the maximum to minimum distance between the yoke assemblies as the leg moves.

A first proximity switch 225 is mounted in the nut tube 197 near the cage for the balls. A second proximity switch 226 is mounted near the end of the protective tube 212. The proximity switches 225 and 226 are used to halt motion when the ball screw rod 195 reaches the limits of its allowed motion. That is, when the end of the ball screw rod 195 changes the state of the proximity switch 226, the power leg will have been shortened to its pre-established limit of travel. The condition showing FIG. 14 is near that short limit of travel. On the other hand, when the end of the ball screw 195 changes the state of the proximity switch 225, the length of the powered leg will have been extended to is maximum desired limit. In both cases, the proximity switches 225 and 226 affect the continued actuation of the motor 199.

One form of instrument arm usable with the machine tools of the present invention, is illustrated in FIGS. 18 and 19. One end of the instrument arm is formed with a solid rod 230 which anchors one end of a first tube 231. The other end of the tube 231 mounts a slide bearing 232 which slides about the outer one of a pair of concentric stationary tubes 233 and 234. The stationary tubes 233 and 234 are each anchored on a rod 235 forming the opposite end of the instrument arm. An outer protective tube 236 is also anchored to the second rod 235 and surrounds the first tube 231. It can be seen therefore, that the first tube 231 can telescope relative to the stationary tubes 233 and 234 and the protective tube 236.

One end of a scale rod 238 is anchored in the solid rod end 230 of the instrument arm. The opposite end of the scale rod 238 is attached to a piston 239 which slides within the inner stationary tube 234. A read head 240 surrounds the scale rod and is attached to the free end of the inner and outer stationary tubes 233 and 234. The read head 240 is therefore stationary with respect to the fixed end 235 of the instrument arm and the scale rod 238 can move longitudinally within the read head 240 as the instrument arm is extended or contracted. The scale rod 238 and reading head 240 are of known construction and operation. Generally, the read head will sense increments of motion along the scale rod as the two are moved relative to each other and will produce a signal which when amplified is used in a known manner to indicate the relative position and changes in position of the two parts. A usable digital positioning measuring system of scale rod and read head may be that built by Sokki Electronics Corporation and identified as the JS7 series of digital positioning systems.

It is important in the operation of the read head and scale rod that the scale rod be kept taut. To that end, air pressure is introduced to act upon the piston 239 which mounts one end of the scale rod 238. The air under pressure is introduced through a central bore 245 in the fixed end 235 of the instrument arm and the air under pressure travels through the space between the inner and outer tubes 233 and 234 and to and through an opening 246 in the inner tube 234 adjacent is attachment to the rad head 240. This introduces pressurized air or the hollow interior of the inner tube 234 in which the piston 239 rides. An orifice passageway 247 extends longitudinally through the read head 240 so that the space between the solid rod 230 of the instrument arm and the read head 240 is connected to the hollow interior a vacuum is not created in that space as the two ends of the instrument arm move relative to each other. The space between the inner and outer stationary tubes 233 and 234 is also used to accommodate wiring 248 connecting the read head to the exterior of the instrument arm.

The instrument arm is preferably mounted in a manner similar to that of the powered legs using yoke assemblies. As with the powered legs, to increase the ratio of the maximum to minimum distance between the yoke assemblies, the yoke assemblies are preferably mounted intermediate the ends such as at the locations 249 and 250 identified in FIG. 18.

The movable end 230 of the instrument arm includes a transverse casting 255 having an inlet 256 and an outlet 257 for air under pressure. The inlet and outlet are connected to a central circular raceway 258 in which a ball bearing 259 is disposed. Air under pressure introduced into the casting 255 will cause the ball bearing 259 to roll rapidly along the raceway 258. This will induce an eccentric motion to the end 230 of the instrument arm about the longitudinal axis of the arm. This eccentric motion is useful to insure that the telescoping elements of the instrument arm can slide smoothly with respect to each other. At the same time, the vibratory motion induced by the spinning ball bearing 259 is in a direction transverse to the direction of motion being measured and therefore does not significantly affect that measurement.

FIG. 20 illustrates a form of instrument arm which uses a laser interferometer. The instrument arm is formed of concentric inner and outer tubes 260 and 261, respectively, that slide past each other on bearings 262 which preferably are made of a polytetraflouride material. A bellows 263 connects the end of the outer tube 261 to the outside of the inner tube 260 so as to close off the volume within the tubes and prevent contamination through the bearings 262. A laser beam from a laser light source 264 enters the hollow interior of the instrument leg through a window 265 and is reflected off a mirror 266 into an interferometer 267 where it is divided into two components. One component exits the interferometer and travels inside of the tubes to a retroreflector 268 which is mounted at the closed end of the outer tube 261. Light is reflected back down the tubes towards the interferometer 267. The two light beam components are recombined within the interferometer 267 and the combined components interfere with each either constructively or destructively depending on their phase. A photo detector within the laser source 264 detects the fringes that result from the interferences between the two components of the light beam as the retro-reflector 268 moves relative to the interferometer. The phase is dependent upon the distance between the interferometer 267 and the retroflector 268 and the fringes are therefore indicative of changes in length of the instrument arm.

The number of light waves in transit between the interferometer 267 and the retro-reflector 268 depends not only on the distance between the two but also on the speed of light. The speed of light in air is dependent upon the atmospheric pressure, temperature and humidity. Pressure and temperature have the largest effect and therefore they must be known if the distance between the interferometer and retro-reflector is to be calculated based on the number of fringes. The air within the interior of the instrument arm is vented to a collapsible bladder 270. As the instrument arm expands, it displaces air that is stored within the bladder 270. The bladder 270 is limp at all times so that the pressure within the arm is equal to the ambient pressure outside of the arm. A single pressure transducer can then be used for all of the instrument arms to determine the pressure of the air through which the light beam is passing. A temperature measurement transducer 271 senses the internal temperature in each instrument arm since the temperature may be localized.

Instead of an instrument arm that has a structural integrity, it is possible to use known forms of positive transducers to measure that distance between the platforms. An example of a usable position transducer is the cable actuated displacement transducers available from Houston Scientific International, Inc. and identified as the 1850 Series. In using such a transducer, a cable would be connected to one of the platforms and the transducer housing to the other platform. A potentiometer within the housing would provide a signal indicative of the length of cable extending from the housing at any particular position of the machine tool components.

A combination of measurements using the power legs and instrument arms can also be used to speed up positioning of the components of the machines. For example, the powered legs could be provided with a linear scale (such as in FIG. 8) or a rotary resolver or shaft encoder (such as in FIG. 9) to provide a position feedback signal that allows a gross positioning of the platforms relative to each other. An associated instrument arm could then be used for fine positioning with the powered legs being moved at a slower rate to the final desired position.

Referring generally to FIGS. 21–24, a measurement system for measuring the distance between two points defining a linear path therebetween will be described. Although this measurement system is designed for combination with the various six-axis machine tools described above, the system is not limited to this particular application but, instead, has a much broader range of potential applications that require precise measurement between two points.

Figure 21:
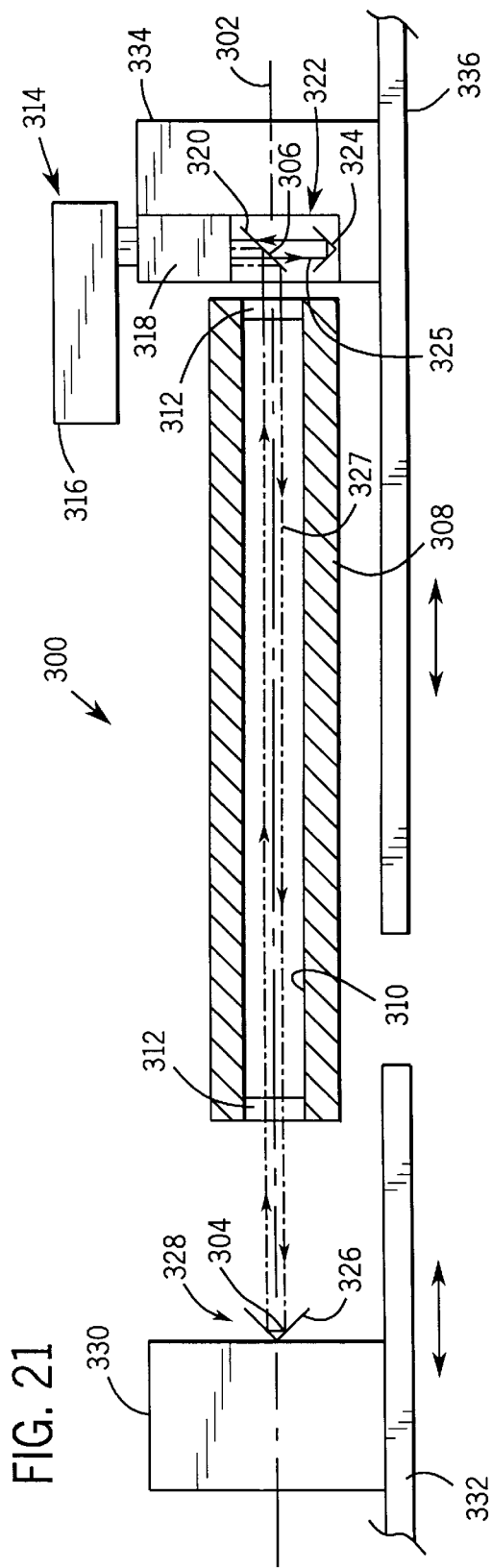
FIG. 21 is a schematic view of a measurement device incorporating a laser interferometer in accordance with the present invention.

A first embodiment of a measurement system 300 is illustrated in FIG. 21. Measurement system 300 is designed to measure the distance along a linear path 302 between a first point 304 and a second point 306.

Measurement system 300 generally includes a deadpath elimination cell 308 having a hollow interior 310 that is disposed along linear path 302. The hollow interior 310 is preferably sealed at both ends. At least one of the ends is sealed with a window 312 that permits the passage of light therethrough. In certain applications, as illustrated in FIG. 21, both ends are sealed with an appropriate window 312, such as BK7 glass.

Measurement system 300 further includes a laser interferometer system 314, which may comprise components such as the Model HS10, manufactured by Renishaw, is used in combination with deadpath elimination cell 308 to precisely measure the distance along linear path 302 between first point 304 and second point 306. Laser interferometer system 314 is generally described above with reference to FIG. 20.

In FIG. 21, the system 314 includes a laser source 316 designed to generate a laser beam. The system also includes a photo detector 318 that detects the fringes resulting from the interferences between the two components of the laser beam. Also, a beam splitter 320 is disposed to split the laser beam generated by laser source 316 into two components, one of which is directed toward a first reflector 324. In the preferred embodiment, beam splitter 320 and first reflector 324 are packaged together as a single unit and shown in the Figures as first laser beam director 322. First reflector 324 reflects one of the laser beams, denoted by the reference numeral 325, directly back to photo detector 318. The other laser beam component, denoted by the reference numeral 327, is directed generally along linear path 302, through sealed hollow interior 310, to a second reflector 326. Second reflector 326, also shown in the Figures as second laser beam director 328, directs second laser beam component 327 back through windows 312 and sealed hollow interior 310 to beam splitter 320 which, in turn, reflects second beam 327 to photo detector 318. The photo detector detects the phase shifts as second reflector 326 is moved with respect to beam splitter 320.

It should be noted that the Figures are schematic representations of a representative laser interferometer system, and the actual components may be arranged differently. Additionally, laser interferometer system 314 and deadpath elimination cell 308 may be incorporated into a variety of environments, applications and equipment. For example, deadpath elimination cell 308 could be statically mounted, while first director 322 and second director 328 are moved with respect thereto. As illustrated in FIG. 21, second director 328 may be mounted to a support structure 330. Support structure 330 would be attached to a movable framework component 332. Similarly, director 322 is illustrated as mounted on a support structure 334. Support structure 334, in turn, is attached to a framework component 336, which may be movable or stationary.

Figure 22:
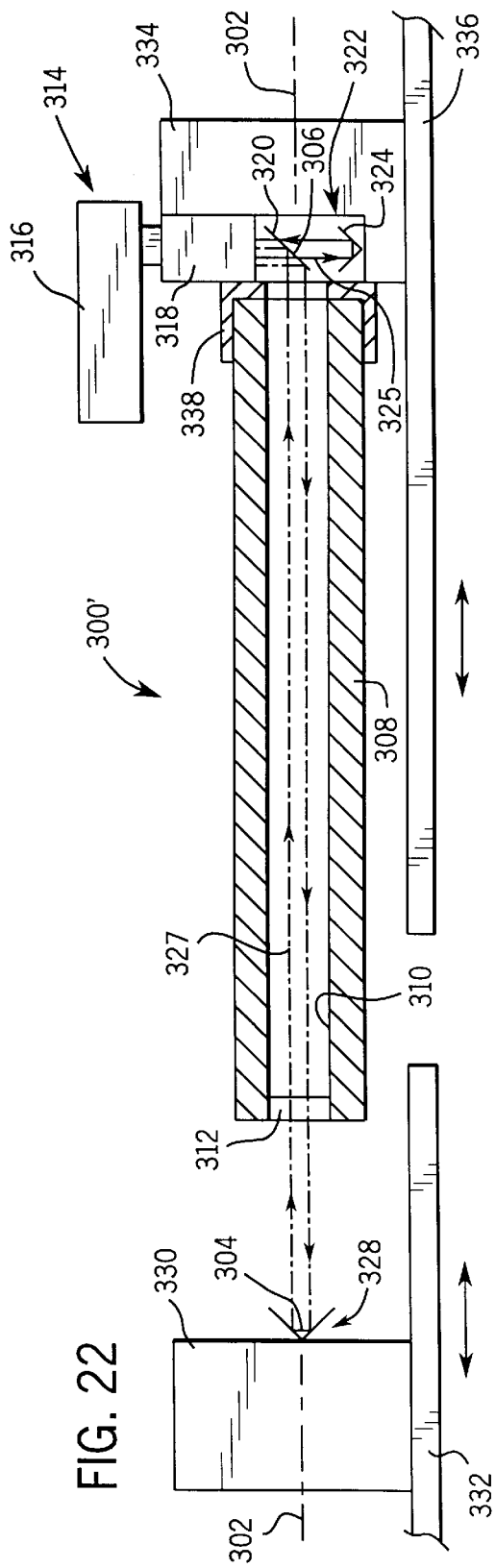
FIG. 22 is a schematic view of another embodiment of the measurement device illustrated in FIG. 21.

In an alternate embodiment of the measurement system denoted by reference numeral 300' and illustrated in FIG. 22, deadpath elimination cell 308 is affixed to support structure 334 proximate first director 322. Deadpath elimination cell 308 may be sealingly engaged with support structure 334 via a fastening mechanism 338, such as a weldment, a threaded socket, or any other fastening mechanism that holds deadpath elimination cell 308 in a fixed position with respect to first director 322. This sealing engagement eliminates the need for one of the windows 312 which would otherwise be disposed towards first director 322. Alternatively, deadpath elimination cell 308 could be affixed to support structure 330 rather than support structure 334. In this instance, the opposite window 312 could be removed, i.e., the window disposed towards second director 328.

Another embodiment of the measurement system denoted by reference numeral 300" and illustrated in FIG. 23, includes many of those components described with reference to FIGS. 21 and 22. The embodiment of FIG. 23 has telescoping components similar to those described with reference to FIG. 20.

Figure 23:
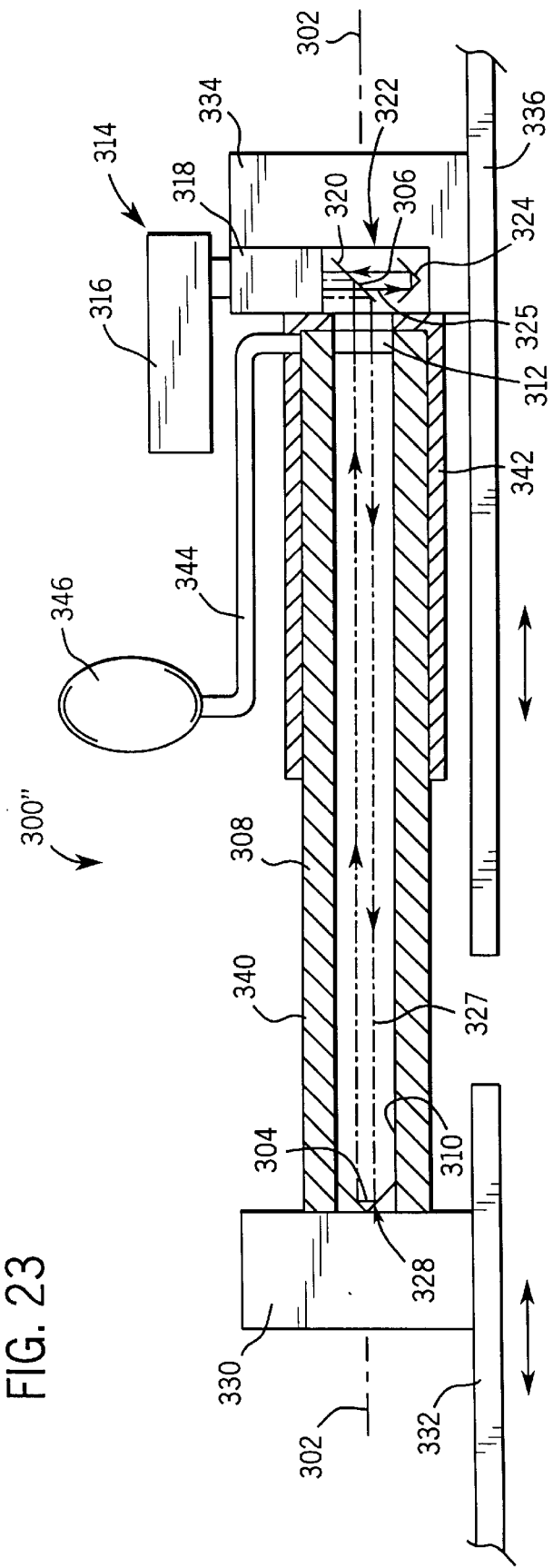
FIG. 23 is a schematic view of a third embodiment of the measurement device illustrated in FIG. 21.

As illustrated in FIG. 23, deadpath elimination cell 308 may be sealingly attached to support structure 330. An external surface 340 of deadpath elimination cell 308 is configured to slide within a hollow outer telescopic member 342. Outer telescopic member 342 is attached to support structure 334 and sealingly engages external surface 340 to form an airtight seal therebetween. The hollow interior of outer telescopic member 342 is connected via a conduit 344 to a bladder or bellows 346 similar to the bellows described above with reference to FIG. 20.

Bellows 346 permits deadpath elimination cell 308 and outer telescopic member 342 to move inwardly and outwardly with respect to one another without drawing any external gases, e.g. air, from outside the measurement system into the hollow interior of outer telescopic member 342. Thus, the change in volume within outer telescopic member 342 as deadpath elimination cell 308 moves inwardly and outwardly is accommodated by bellows 346 which inflates and deflates, respectively. This prevents contamination from entering. A window 312, shown in FIG. 23, seals the deadpath elimination cell. This keeps the density of gas inside of it constant, which results in a constant wavelength.

Figure 24:
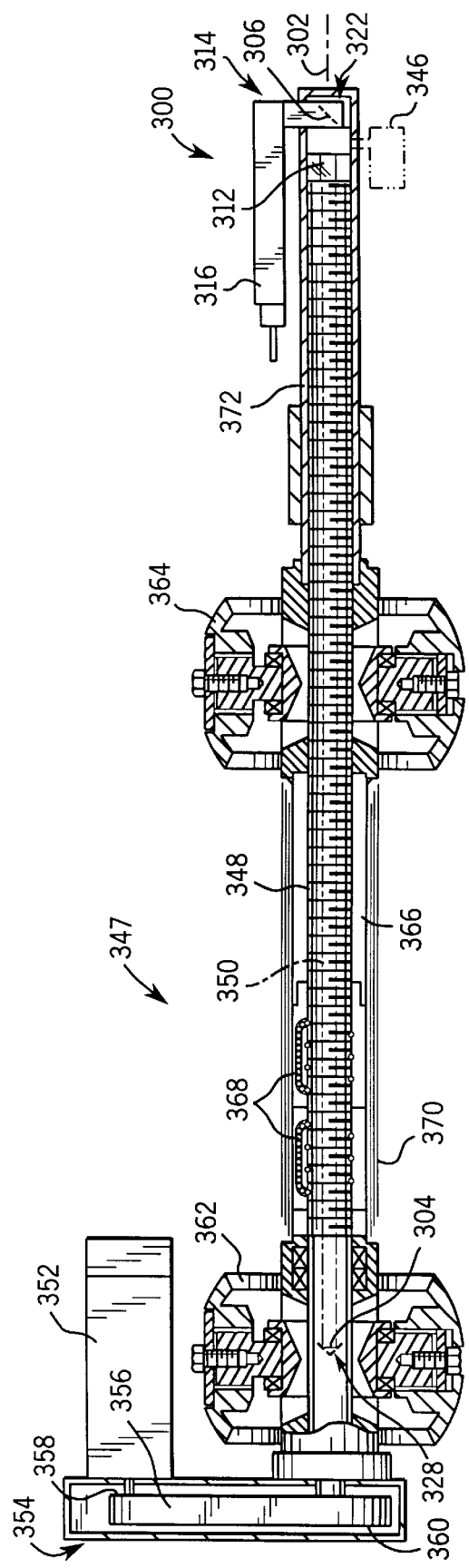
FIG. 24 is a cross-sectional view of a measurement system incorporating a laser interferometer and used in the extensible leg of a machine tool according to a preferred embodiment of the invention.

An preferred embodiment of measurement system 300 is illustrated in FIG. 24. In this specific embodiment, measurement system 300 is incorporated into a powered leg 347 similar to the ball screw driven powered leg described with reference to FIGS. 14–17. The above discussion can be referred to for the specifics of typical ball screw type powered legs used with machine tools of the present invention. Additionally, it should be noted that the measurement system may be incorporated into measurement arms separate from the powered legs; the measurement system may be incorporated into a variety of other powered legs, including hydraulic or pneumatically powered legs; and the system may be incorporated into many other applications where precise measurement of distances between two points is required.

Generally, the embodiment of FIG. 24 includes a rotatable ball screw rod 348 having a hollow interior 350. The ball screw rod 348 is rotated by a motor 352, such as a hydraulic or electric motor. Motor 352 is connected to ball screw rod 348 by a drive mechanism 354, such as a belt 356 mounted about a motor pulley 358 and a ball screw rod pulley 360. Other drive mechanisms that may also be used include chain and sprocket drives, hydraulic drives, and direct gear drives.

Ball screw rod 348 is rotatably mounted within a pair of yoke assemblies, sometimes referred to as gimbal joints 362 and 364 respectively. The operation of yoke assemblies 362 and 364 are described above with reference to FIGS. 14–17. Additionally, a nut tube 366 surrounds and is operatively connected to ball screw rod 348 by a plurality of recirculating balls comprising ball nuts 368. Thus, as ball screw rod 348 is rotated within nut tube 366, yoke assemblies 362 and 364 are driven farther apart or closer together depending on the direction of rotation of ball screw rod 348. Additionally, a telescoping shroud 370 may be connected between yoke assemblies 362 and 364.

A tubular housing 372 is attached to gimbal joint 364 and surrounds the end of ball screw rod 348 that extends beyond yoke assembly 364 opposite yoke assembly 362. In certain applications, tubular housing 372 may be entirely sealed and connected to a bladder or bellows, such as bellows 346 (shown in phantom), to contain the same supply of gas within the tubular housing 372 to keep contamination out. Tubular housing 372 is designed with sufficient strength to support laser interferometer system 314.

In the embodiment of FIG. 24, laser source 316 is mounted to tubular housing 372. The first director 322 is mounted within the distal end of tubular housing 372 separate from ball screw rod 348. One window 312 is mounted to the end of ball screw rod 348 disposed toward first director 322. This window 312 seals the hollow interior 350 of ball screw rod 348. The second director 328 is sealingly mounted at the other end of hollow interior 350, preferably at the approximate center of the yoke assembly 362. Thus, laser interferometer system 314 is able to precisely measure the distance between the points at which first director 322 and second director 328 are disposed on the ball screw driven powered leg 347.

The above described application of measurement system 300 is particularly advantageous for use with machine tools having movable platforms such as those described above. When yoke assemblies 362 and 364 are disposed in their closest position, as illustrated in FIG. 24, window 312 and first director 322 are adjacent one another and laser interferometer system 314 may be consistently calibrated with little deadpath error due to the constant quantity of trapped gas within hollow interior 350. As yoke assembly 364 is driven away from yoke assembly 362, tubular housing 372 moves first director 322 away from window 312, and laser interferometer system 314 is able to precisely calculate the change in distance between the yoke assemblies and thereby supply an appropriate signal to a controller (not shown) that may, for instance, control the movement of the platforms for proper machining of a component. The long-term reliability of laser interferometer system 314 to measure these changes in distance may be further improved by connecting bellows 346 with the interior of tubular housing 372 to maintain an uncontaminated supply of gas that cooperates with tubular housing 372 as ball screw rod 348 moves towards and away from first director 322.

It will be understood that the foregoing description is of a preferred embodiment of the invention and the invention is not limited to the specifics of that which is described. For example, the measurement system may be incorporated into a variety of environments and applications, a variety of laser interferometers may be used, the deadpath elimination cell may be filled with a variety of gases and could potentially be filled with a liquid or a solid such as plastic or glass, to effectively form a longer window filling the hollow interior of the cell. These and other modifications may be made in the design and arrangement of the system and components described above without departing from the scope of the invention.

What is claimed is:

1. An extendable leg for a positioning device, the extendable leg comprising:
    first and second elongated hollow leg members adapted to be coupled together in a telescopic manner;
    a first yoke assembly connected to the first leg member and adapted to be coupled to a first part of the positioning device;
    a second yoke assembly connected to the second leg member and adapted to be coupled to a second part of the positioning device that moves with respect to the first part;
    a powered extension mechanism at least partially disposed within the first and second leg members for increasing and decreasing the distance between the first and second yoke assemblies;
    a laser interferometer having first and second laser beam directors disposed within the first and second leg members, respectively, such that the interferometer is adapted to reflect a laser beam between the first and second directors to provide an indication of the distance therebetween; and
    a deadpath reduction cell disposed in the path of the laser beam between the first and second directors within the first and second leg members, the cell having a hermetically sealed interior of a constant volume including a gas, the cell adapted to reduce the deadpath measurement error by maintaining the gas within the cell at a constant density.

2. The extendable leg of claim 1, wherein the powered extension mechanism includes a screw rod having a hollow bore longitudinally extending at least partially therethrough, the hollow bore including the deadpath reduction cell, and the screw rod being adapted to rotate and being disposed such that the laser beam extends at least partially into its hollow bore.

3. The extendable leg of claim 2, wherein the deadpath reduction cell includes at least one window attached to the screw rod and adapted to pass the laser beam therethrough and to provide a hermetic seal for the hollow bore.

4. The extendable leg of claim 3, wherein at least one of the first and second directors is disposed inside the hollow bore of the screw rod.

5. The extendable leg of claim 1, wherein the deadpath reduction cell is adapted to hermetically seal substantially the entire path of the laser beam between the first and second directors when the distance between the first and second yoke assemblies is at its minimum operating distance.

6. A measurement system for precisely measuring the distance between two points of an extendable leg for a positioning device, the leg having a powered extension mechanism for extending the length of the leg, the two points defining a linear path therebetween along which the extendable leg extends, the measurement system characterized by:
    a laser interferometer having a laser source and having first and second laser beam directors, at least one director disposed inside the extendable leg and oriented such that the laser interferometer is adapted to reflect a laser beam between the first and second directors to provide an indication of the distance therebetween; and
    a deadpath reduction cell at least partially disposed in the path of the laser beam between the first and second directors, the deadpath reduction cell having a hermetically sealed hollow interior of a constant volume adapted to reduce the deadpath measurement error.

7. The measurement system of claim 6, wherein the first and second laser beam directors are disposed substantially along the linear path defined by the two points of the extendable leg such that the laser interferometer reflects a laser beam substantially along the linear path.

8. The measurement system of claim 7, wherein the hollow interior of the deadpath reduction cell is hermetically sealed by at least one window that permits the passage of the laser beam therethrough.

9. The measurement system of claim 8, wherein the first director is disposed outside the hollow interior of the deadpath reduction cell.

10. The measurement system of claim 9, wherein the second director is disposed inside the hollow interior of the deadpath reduction cell.

11. The measurement system of claim 6, wherein the positioning device is a six-axis machine having first and second platforms, and six extendable legs, wherein one part of each of the six extendable legs is pivotally attached to the first platform approximately at a first of the two points, and another part of each of the extendable legs is pivotally attached to the second platform approximately at a second of the two points.

12. The measurement system of claim 11, wherein the extendable leg includes:

first and second elongated hollow leg members adapted to be coupled together in a telescopic manner;

a first yoke assembly connected to the first leg member and adapted to be coupled to a first part of the positioning device;

a second yoke assembly connected to the second leg member and adapted to be coupled to a second part of the positioning device that moves with respect to the first part;

a powered extension mechanism at least partially disposed within the first and second leg members for increasing and decreasing the distance between the first and second yoke assemblies.

13. The measurement system of claim 12, wherein the powered extension mechanism includes a drive screw coupled to and rotated by a motor.

14. The measurement system of claim 13, wherein the drive screw has a hollow bore longitudinally extending at least partially therethrough, the hollow bore including the deadpath reduction cell, and the drive screw being disposed such that the laser beam extends at least partially into its hollow bore.

15. The measurement system of claim 12, wherein the deadpath reduction cell is adapted to hermetically seal substantially the entire path of the laser beam between the first and second directors when the distance between the first and second yoke assemblies is at its minimum operating distance.

16. A measurement system for precisely measuring the distance between two points of an extendable leg for a multiple-axis positioning machine, the positioning machine having first and second platforms and at least three extendable legs, one part of each of the extendable legs being pivotally attached to the first platform at a first of the two points, and the other part of each of the extendable legs being pivotally attached to the second platform at a second of the two points, each of the legs including a powered extension mechanism at least partially disposed within the extendable leg for increasing and decreasing the distance between the two points, the measurement system comprising:

a laser interferometer having a laser source and having first and second laser beam directors, at least one director disposed inside the extendable leg and oriented such that the laser interferometer is adapted to reflect a laser beam between the first and second directors to provide an indication of the distance therebetween; and a deadpath reduction cell at least partially disposed in the path of the laser beam between the first and second directors, the deadpath reduction cell having a hermetically sealed hollow interior of a constant volume adapted to reduce the deadpath measurement error.

17. The measurement system of claim 16, wherein the powered extension mechanism includes a drive screw coupled to and rotated by a motor.

18. The measurement system of claim 17, wherein the drive screw has a hollow bore longitudinally extending at least partially therethrough, the hollow bore including the deadpath reduction cell, and the drive screw being disposed such that the laser beam extends at least partially into its hollow bore.

* * * * *